(12) United States Patent
Capitani et al.

(10) Patent No.: US 11,542,045 B2
(45) Date of Patent: Jan. 3, 2023

(54) APPARATUS AND METHOD OF MAKING CONTAINERS

(71) Applicant: Cryovac, LLC, Charlotte, NC (US)

(72) Inventors: Stefano Capitani, Como (IT); Ivo Pascolo, Senago (IT)

(73) Assignee: Cryovac, LLC, Charlotte, NC (US)

( * ) Notice: Subject to any disclaimer, the term of this patent is extended or adjusted under 35 U.S.C. 154(b) by 0 days.

(21) Appl. No.: 17/058,198

(22) PCT Filed: May 23, 2019

(86) PCT No.: PCT/IB2019/054260
§ 371 (c)(1),
(2) Date: Nov. 24, 2020

(87) PCT Pub. No.: WO2019/229594
PCT Pub. Date: Dec. 5, 2019

(65) Prior Publication Data
US 2021/0188466 A1 Jun. 24, 2021

(30) Foreign Application Priority Data
May 30, 2018 (IT) .................. 102018000005876

(51) Int. Cl.
*B65B 9/093* (2012.01)
*B65B 43/30* (2006.01)
(Continued)

(52) U.S. Cl.
CPC ............ *B65B 9/093* (2013.01); *B29C 65/224* (2013.01); *B29C 65/7891* (2013.01);
(Continued)

(58) Field of Classification Search
CPC .............. B29C 65/224; B29C 66/4312; B29C 66/1122; B29C 66/8511; B65D 75/008
(Continued)

(56) References Cited

U.S. PATENT DOCUMENTS

| 3,198,685 A | * | 8/1965 | Kopito | ............... B29K 2883/00 |
| | | | | 156/583.2 |
| 3,466,836 A | * | 9/1969 | Pratt | ........................ B65B 9/06 |
| | | | | 53/450 |

(Continued)

FOREIGN PATENT DOCUMENTS

| CN | 107108053 A | 8/2017 |
| EP | 0155548 A2 | 9/1985 |

(Continued)

OTHER PUBLICATIONS

Written Opinion of the International searching authority in PCT/IB2019/054260 dated May 12, 2019.

*Primary Examiner* — Robert F Long
*Assistant Examiner* — Xavier A Madison
(74) *Attorney, Agent, or Firm* — Jon Isaacson

(57) ABSTRACT

An apparatus is configured to make containers from sheet material. The apparatus includes a supply station for supplying a film having at least one folded portion having three or more film flaps folded and superimposed with respect to each other; a welding station configured to receive the film. The welding station comprises a welding head configured for welding the folded portion of the film and forming a container defining a housing compartment; the welding head comprises a heater made of electrically conductive material whose electrical resistivity, at least in a predetermined temperature range, decreases upon the increase of the temperature of the same electrically conductive material.

8 Claims, 7 Drawing Sheets

(51) Int. Cl.
*B65B 51/14* (2006.01)
*B65B 55/04* (2006.01)
*B65B 61/06* (2006.01)
*B65D 75/00* (2006.01)
*B29C 65/22* (2006.01)
*B29C 65/78* (2006.01)
*B29C 65/00* (2006.01)
*B29L 31/00* (2006.01)

(52) U.S. Cl.
CPC ........ *B29C 66/1122* (2013.01); *B29C 66/133* (2013.01); *B29C 66/4312* (2013.01); *B29C 66/72341* (2013.01); *B29C 66/81262* (2013.01); *B29C 66/81871* (2013.01); *B29C 66/849* (2013.01); *B29C 66/8432* (2013.01); *B29C 66/8511* (2013.01); *B29C 66/91441* (2013.01); *B29C 66/91653* (2013.01); *B65B 43/30* (2013.01); *B65B 51/14* (2013.01); *B65B 55/04* (2013.01); *B65B 61/06* (2013.01); *B65D 75/008* (2013.01); *B29L 2031/7129* (2013.01)

(58) Field of Classification Search
USPC .......................................................... 53/450
See application file for complete search history.

(56) References Cited

U.S. PATENT DOCUMENTS

| | | | | |
|---|---|---|---|---|
| 3,469,768 | A * | 9/1969 | Repko | B65D 31/12 383/207 |
| 3,982,991 | A * | 9/1976 | Hamm | B29C 65/18 156/515 |
| 4,793,121 | A * | 12/1988 | Jamison | B65B 61/18 425/389 |
| 4,861,413 | A * | 8/1989 | Schmitz | B29C 65/7433 156/515 |
| 4,981,546 | A * | 1/1991 | Bergevin | B29C 66/349 156/515 |
| 5,457,937 | A * | 10/1995 | Wald | B29C 66/80 156/515 |
| 5,966,907 | A * | 10/1999 | Julius | B65B 51/30 53/550 |
| 6,389,782 | B1 * | 5/2002 | Kinugawa | B41M 3/12 53/550 |
| 2004/0031244 | A1 * | 2/2004 | Steele | B65D 75/5805 53/450 |
| 2006/0075723 | A1 * | 4/2006 | Burriez | B29C 65/7451 53/435 |
| 2007/0107380 | A1 * | 5/2007 | Shepard | B65B 9/20 53/412 |
| 2011/0289885 | A1 * | 12/2011 | Re | B29C 65/224 53/510 |
| 2015/0096262 | A1 * | 4/2015 | Fujitani | B65B 61/06 53/411 |

FOREIGN PATENT DOCUMENTS

| | | |
|---|---|---|
| ES | 2296451 A1 | 4/2008 |
| JP | S52123471 U | 9/1977 |
| JP | S55161614 A | 12/1980 |
| JP | S6423921 A | 1/1989 |
| WO | 2016055599 A1 | 4/2016 |

* cited by examiner

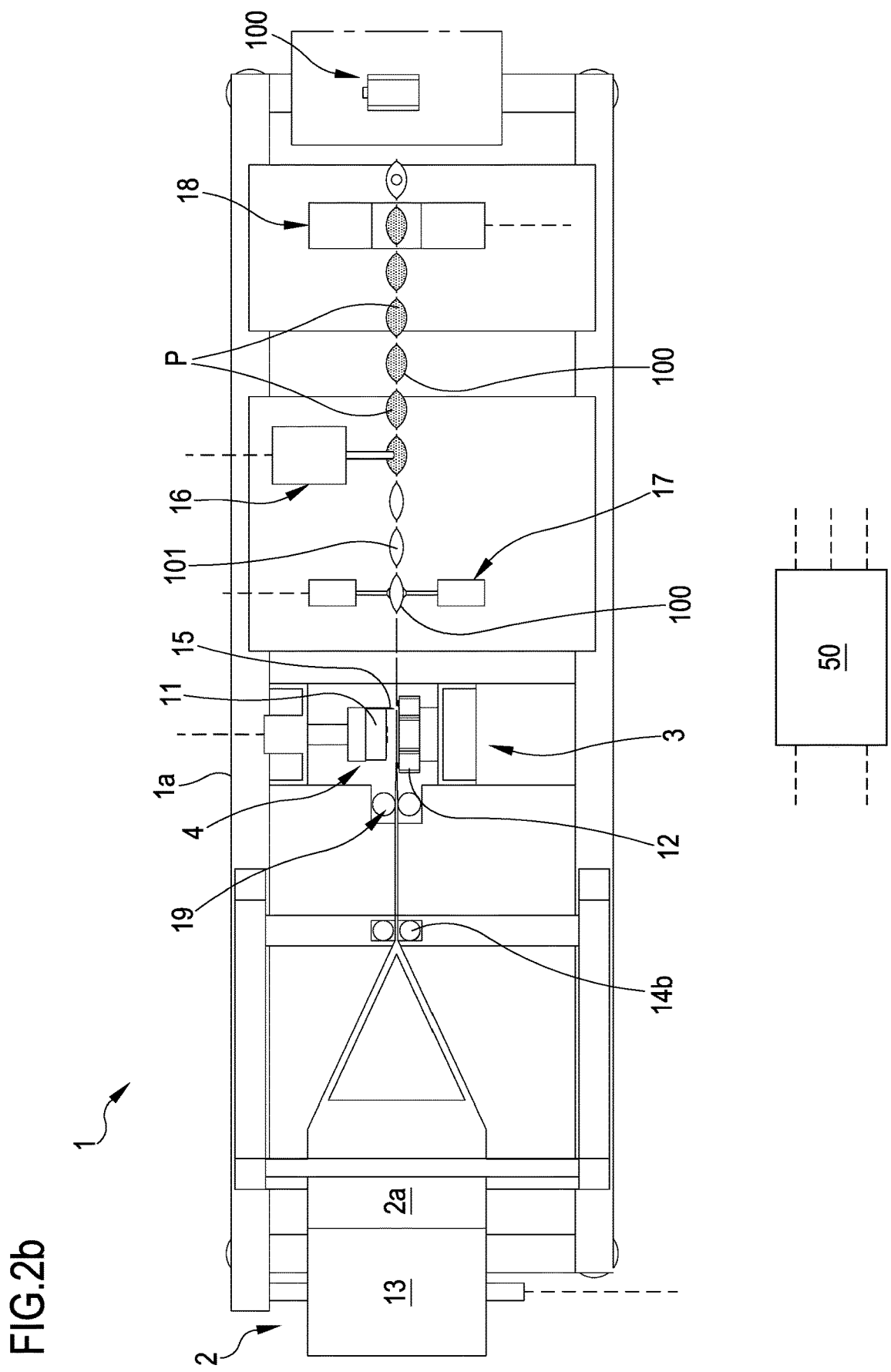

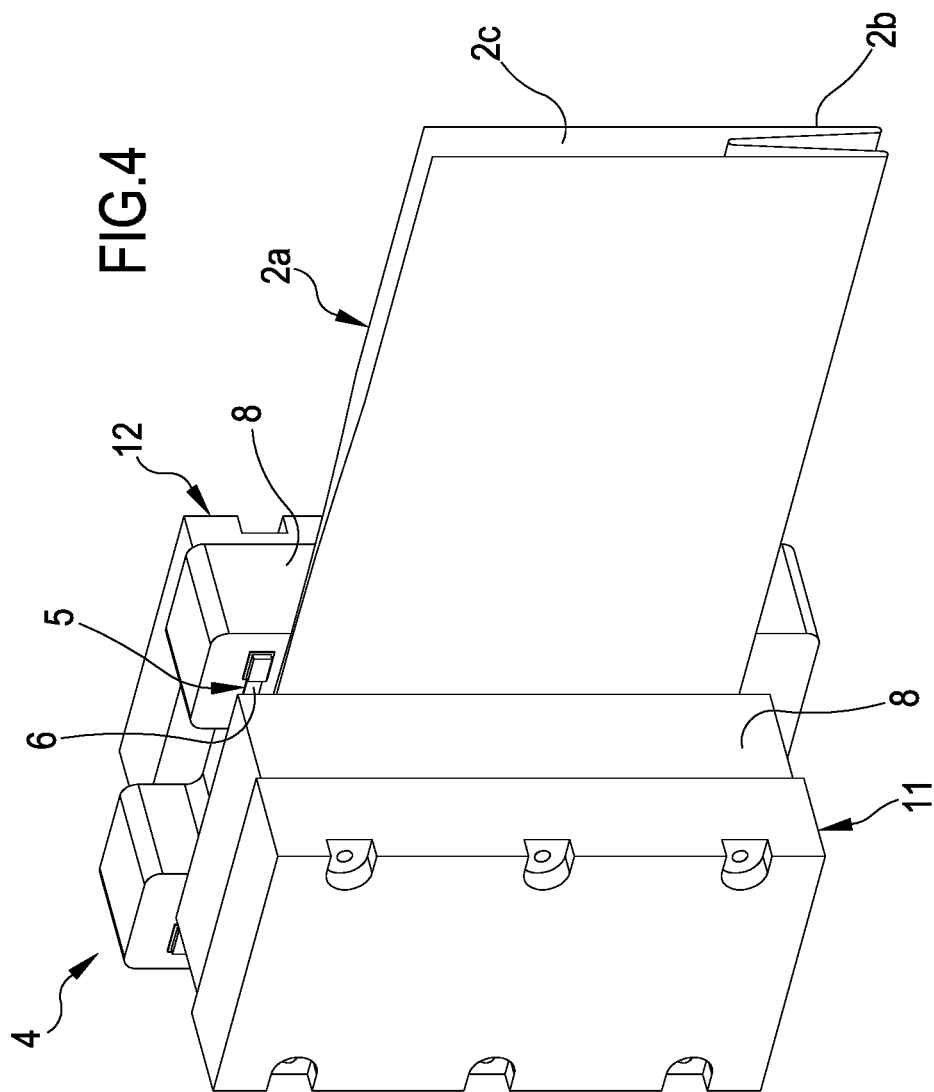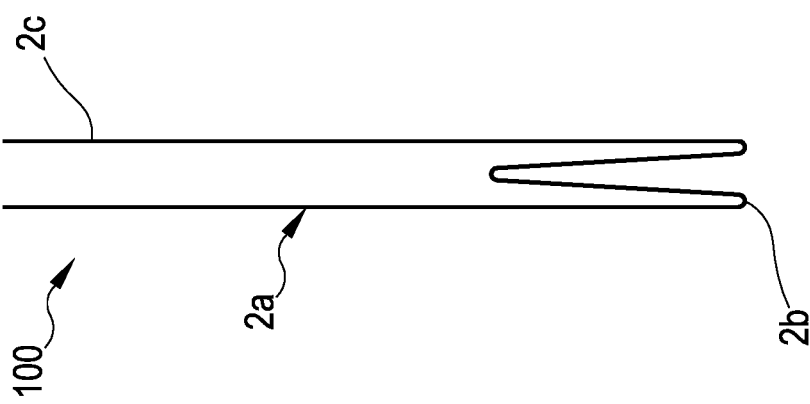

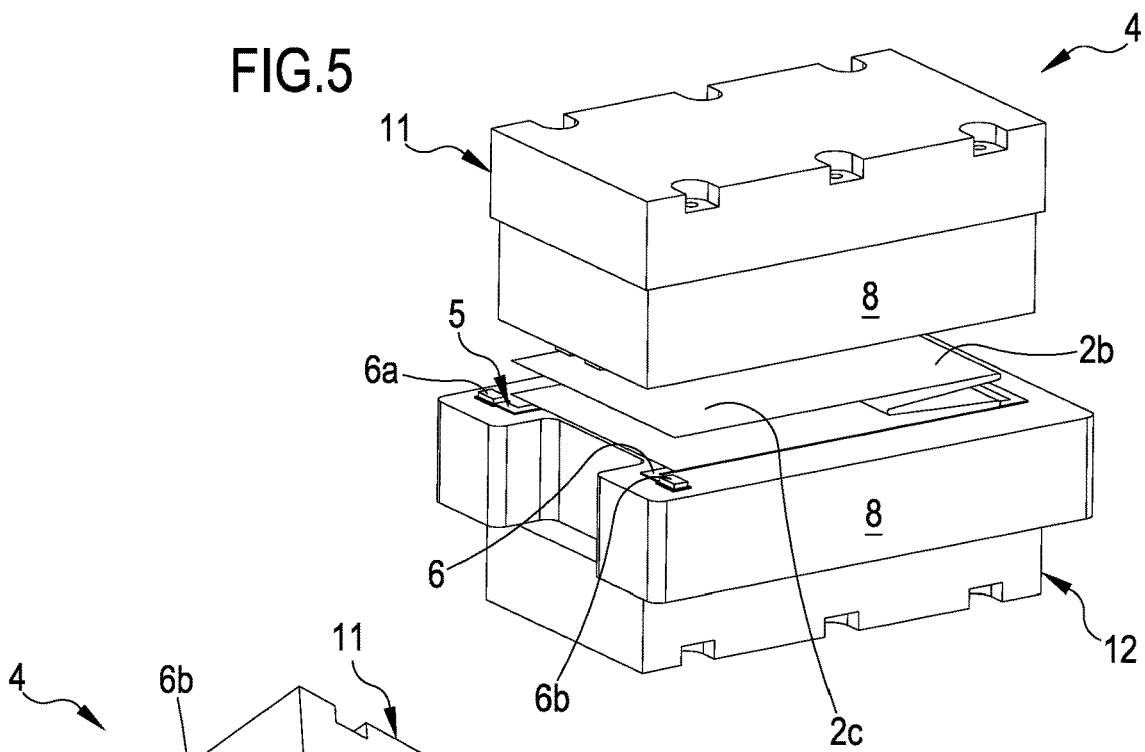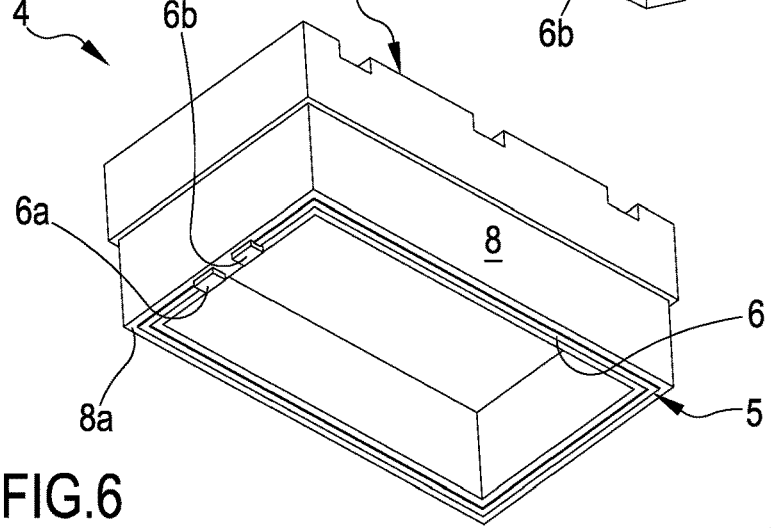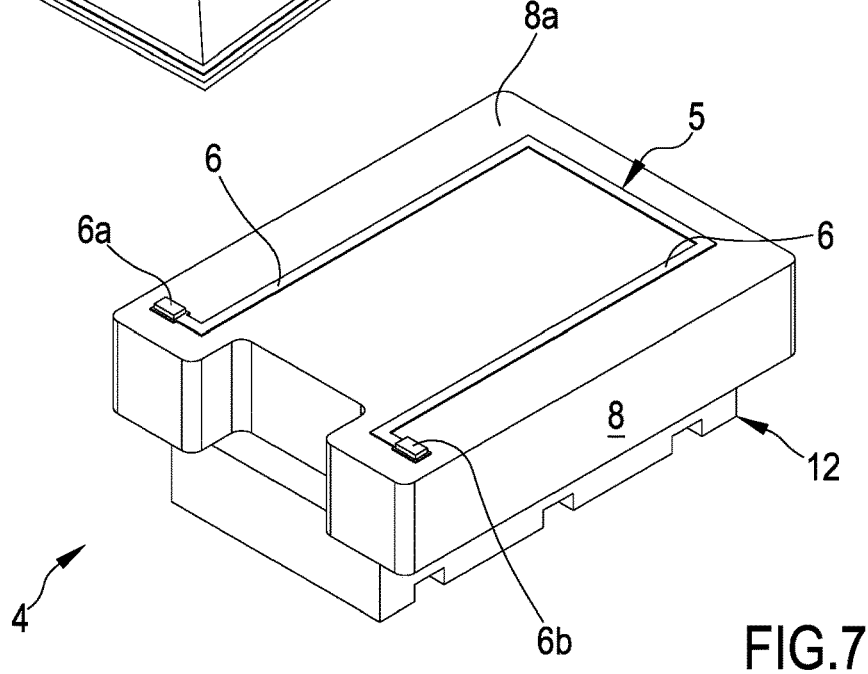

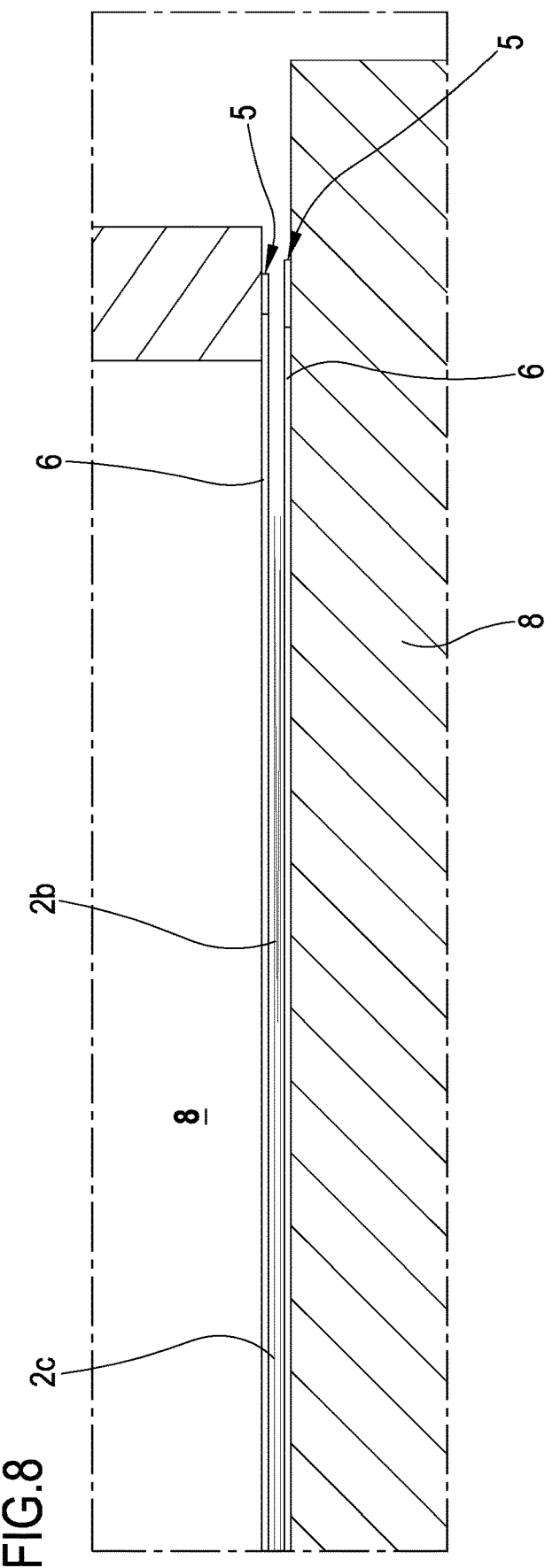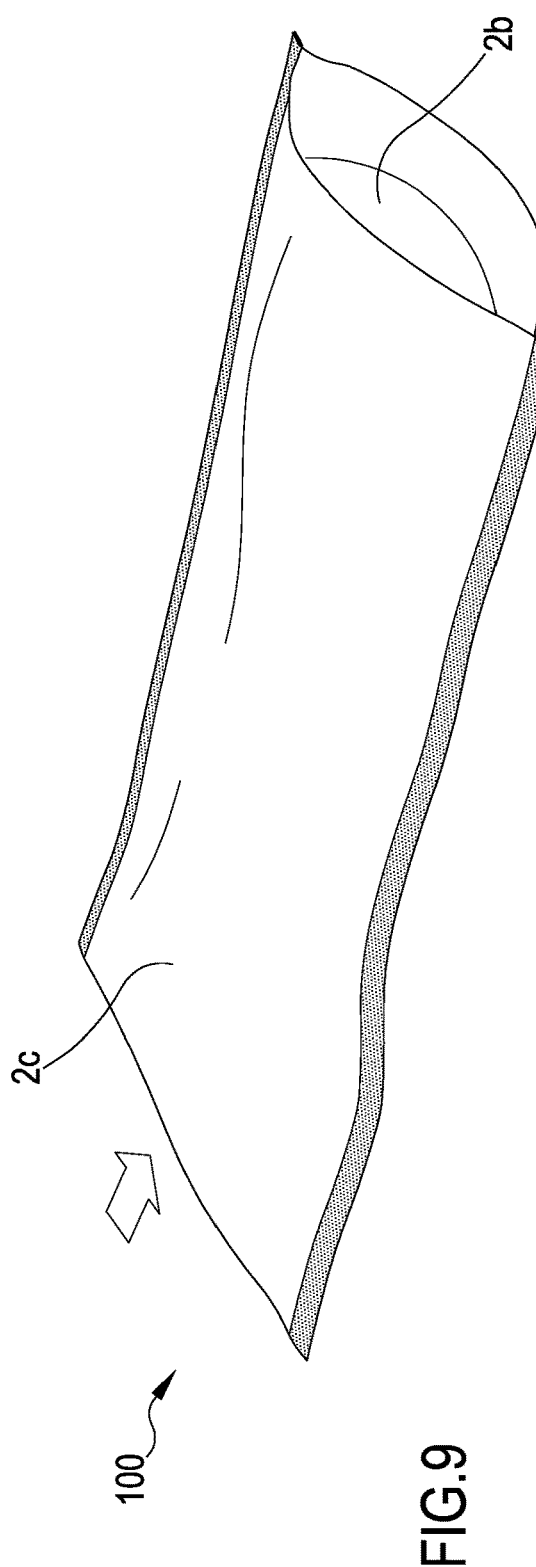

APPARATUS AND METHOD OF MAKING CONTAINERS

FIELD OF THE INVENTION

The object of the present invention is an apparatus and a relative method of making containers, e.g. bags made of sheet material. The apparatus and the method, object of the present invention, can be advantageously applied for forming so-called stand up pouches for containing food products, for example drinks and ready meals.

STATE OF THE ART

Packs with hermetic closure are commonly used for containing foods. One particular type of pack is defined by the so-called stand up pouches, constituted by a flexible plastic laminate and folded/heat-welded metal sheets. Such pouches are employed for packaging a wide variety of foods, e.g. drinks and ready meals. The stand up pouches comprise a bottom folded as a W-shaped configured to maintain the pack in vertical position: the folded bottom, even if constituted by laminates made of flexible material, defines a base sufficiently rigid for supporting the pack. Generally, at the tops of the pouch, this comprises a closure/dispensing cap heat-welded to the laminated sheet.

Pouches are made starting from a continuous sheet unwound from a reel. A double folding is executed on the moving sheet, along an advancing direction of the sheet; in such a manner such sheet can define a "W" shaped bottom and a top having two sheet flaps facing each other. Following the folding step, a series of multi-stage transverse welds of the sheet are executed which are adapted to define a precursor body comprising a plurality of packs joined together and defining respective seats for housing products. Then, the process provides for the insertion of products in the seats of each pack, the closure of the same via heat-welding and a final step of cutting the precursor body for the formation of single pouches. The transverse welding is executed by means of a plurality of welding heads distributed along the advancing direction of the folded sheet; each head comprises two movable tools configured for compressing the sheet and executing a predetermined welding profile. The use a plurality of heads allows executing multiple welding stages on the same folded portion.

One example is described in the patent No. ES2296451B1 aimed for a process for making stand up pouches by means of three-stage welding of a folded film made of plastic material: in order to be able to ensure the correct welding of the folded sheet, the process described in the present Spanish patent executes—at predetermined time intervals—three different welds of the sheet. The presence of a folded bottom with high thickness (having four superimposed laminated film flaps) makes it difficult to melt all the flaps of the bag during the welding step; in order to be able to ensure a correct closure of the bag, the known solutions provide for a multi-stage welding.

A further example, relative to a device for welding thermoplastic material sheets, is described in the patent application No. U.S. Pat. No. 3,198,685 A; such device comprises a welding head carrying a plurality of welding plates: each plate bears a conductor element configured for contacting and welding together two layers of thermoplastic material. The device can be employed for making bags.

Further examples of welding devices are described in the following patents: JP S52 123471 U, JP S55 161614 A, EP 0 155 548 A2, JP S64 23921 A, WO 2016/055599 A1.

Even if the known solutions allow obtaining hermetically closed packs, the Applicant has detected that the conventional solutions do not lack limitations and drawbacks. For example, the known welding heads are unable to ensure the sealing of the bag by means of one single welding step; the conventional apparatuses indeed require a plurality of heads aligned along the extension of the folded continuous film in a manner such that at least two different welding steps are executed on the bottom of the pack. This necessary configuration negatively affects the complexity and size of the apparatus. As can be understood, the higher the number of welding heads, the greater the size of the apparatus along the film advancing trajectory; in addition, the presence of a high number of welding heads considerably complicates the apparatus, which must be configured to synchronize and maintain aligned the multiple welding stages. The Applicant has also detected that the film sustains an uncontrolled deformation during each welding stage, which must then be continuously adjusted in movement such that the film portions/single packs can reach the various stations in the correct position.

OBJECT OF THE INVENTION

The object of the present invention is to resolve at least one of the drawbacks and/or limitations of the previous solutions.

A first objective of the present invention is to provide an apparatus for making containers made of folded film capable of executing an efficient and quick sealing of the film; in particular, one object of the present invention is to provide an apparatus capable of controlling the heat supplied to the film of the container at least during a hot sealing step of said film. Another object of the present invention is to provide an apparatus for making containers that is highly flexible in the use thereof and that can operate, using the same configuration, with different types of containers, in particular with different films of the container.

Another objective of the present invention is to provide an apparatus and a relative method of making containers with low energy consumption and simultaneously able to efficiently provide the heat necessary for sealing the container.

One object of the present invention is to provide an apparatus that is compact and simple in operation, which can thus reduce to a minimum the investments for implementing the same. An auxiliary object of the present invention is to provide an apparatus and a method capable of operating in a highly reliable manner, reducing the possible maintenance works to a minimum.

These and still other objects, which will be clearer from the following description, are substantially reached by an apparatus and a method for packaging in accordance with that expressed in one or more of the enclosed claims and/or of the following aspects, taken separately or in any one combination with each other or in combination with any one of the enclosed claims and/or in combination with any one of the further aspects or characteristics described hereinbelow.

SUMMARY

In a 1st aspect, an apparatus (1) is provided for making containers (100) made of sheet material, said apparatus (1) comprising:

a supply station (2) for supplying a film (2*a*), the film having at least one folded portion (2*b*) having 3 or more film flaps folded and superimposed with respect to each other, a welding station (3) configured to receive the film (2a) from the supply station (2), in which the welding station (3) comprises at least one welding head (4) configured to contact the film (2a) and weld at least the folded portion of said film (2a) in order to form a container having a housing compartment (101), in which the welding head (4) comprises at least one heater (5) made of electrically conductive material.

In a 2nd aspect in accordance with the 1st aspect the electrically conductive material of the heater (5) has an electrical resistivity which, at least in a predetermined temperature range, decreases upon the increase of the temperature of the same electrically conductive material.

In a 3rd aspect in accordance with any one of the preceding aspects the electrically conductive material of the heater (5) comprises at least one selected from between: carbon, semiconductor material.

In a 4th aspect in accordance with any one of the preceding aspects the electrically conductive material of the heater (5) has a carbon structure which comprises or is exclusively formed by one or more carbon allotropes selected from among:
graphite;
monolayer or multilayer graphene;
fullerene, in which the carbon atoms are bonded in spherical, tubular, fibrous or ellipsoidal formations, optionally said fullerene takes the shape of carbon nanotubes or carbon nanofibers.

In a 5th aspect in accordance with the preceding aspect the carbon structure comprises or is formed by one or more graphene layers.

In a 6th aspect in accordance with any one of the aspects from the 2nd to the 5th, the predetermined temperature range is comprised between −30° C. and 300° C., optionally between 4° C. and 220° C.

In a 7th aspect in accordance with any one of the aspects from the 2nd to the 6th the electrical resistivity of the electrically conductive material, in the predetermined temperature range, varies between $20*10^{-6}$ Ωm and $1*10^{-6}$ Ωm, optionally between $7*10^{-6}$ Ωm and $4*10^{-6}$ Ωm.

In an 8th aspect in accordance with any one of the aspects from the 2nd to the 7th the electrical resistivity of the electrically conductive material, following an increase of temperature of 1° C. of the electrically conductive material within said predetermined temperature range, is reduced by an amount comprised between $2*10^{-9}$ Ωm and $8*10^{-9}$ Ωm, optionally between $4.5*10^{-9}$ Ωm and $5.5*10^{-9}$ Ωm.

In a 9th aspect in accordance with any one of the preceding aspects the electrical resistivity of the electrically conductive material is comprised between $20*10^{-6}$ Ωm and $1*10^{-6}$ Ωm, optionally between $7*10^{-6}$ Ωm and $4*10^{-6}$ Ωm.

In a 10th aspect in accordance with any one of the preceding aspects the heater (5) comprises a conductive strip (6) having a substantially flat and extended conformation.

In an 11th aspect in accordance with the preceding aspect the conductive strip (6) is made of a single body and is continuously extended between a first and a second terminal (6a, 6b).

In a 12th aspect in accordance with the 10th or 11th aspect the conductive strip (6) defines a flat body with constant thickness.

In a 13th aspect in accordance with any one of the preceding aspects the heater (5), optionally the conductive strip (6), has a substantially "I" or "U" or a "⌊ ⌋" shape.

In a 14th aspect in accordance with any one of the preceding aspects the welding head (4) comprises at least one support substrate (8) made of electrically insulating material carrying said heater (5).

In a 15th aspect in accordance with the preceding aspect the heater (5) is constrained to a contact surface (8a) of the support substrate (8).

In a 16th aspect in accordance with any one of the preceding aspects the welding head (4) comprises at least one protective layer (9) arranged to cover the heater (5).

In a 17th aspect in accordance with the preceding aspect the protective layer is configured to prevent the direct contact of the latter and the film.

In an 18th aspect in accordance with the 16th or 17th aspect the protective layer (9) defines the exposed element of the welding head (4) adapted to define a heating surface configured to directly contact the film (2a).

In a 19th aspect in accordance with any one of the aspect from the 16th to the 18th the protective layer (9) comprises at least one sheet of insulating material which covers the entire surface of the heater (5), optionally of the conductive strip (6).

In a 20th aspect in accordance with any one of the aspects from the 16th to the 19th the protective layer defines an exposed surface of direct contact of the film (2a).

In a 21st aspect in accordance with any one of the aspects from the 16th to the 20th the heater (5) is interposed between the substrate (8) and the protective layer (9).

In a 22nd aspect in accordance with any one of the aspects from the 16th to the 21st the conductive strip (6) is directly in contact with the protective layer (9).

In a 23rd aspect in accordance with any one of the aspects from the 14th to the 22nd the welding head (4) comprises at least one electrically insulating layer (10) directly in contact with the heater (5) and with the support substrate (8).

In a 24th aspect in accordance with any one of the aspects from the 14th to the 23rd the electrically insulating layer (10) is on one side directly in contact with the conductive strip (6) and on the other side with the support substrate (8).

In a 25th aspect in accordance with any one of the aspects from the 14th to the 24th the support substrate (8) comprises a flat plate made of insulating material.

In a 26th aspect in accordance with any one of the aspects from the 14th to the 25th the support substrate (8) comprises a monolithic plate made of plastic material.

In a 27th aspect in accordance with any one of the aspects from the 14th to the 26th the support substrate (8) is made of at least one selected from the group among the following materials: glass fiber, cotton, aramid fiber, phenol resin, acrylic resin, epoxy resin.

In a 28th aspect in accordance with any one of the preceding aspects the welding head (4) comprises at least one first and one second tool (11, 12) that are movable with respect to each other at least between:
a first operative condition in which said tools (11, 12) are spaced from each other and configured for enabling the positioning at least of the folded portion (2b) of the film (2a) between said tools (11, 12),
a second operative position in which said tools (11, 12) are approached to each other and configured for enabling the welding at least of the folded portion (2b) of the film (2a) in order to define said container.

In a 29th aspect in accordance with the preceding aspect the first and second tools (11, 12), in the second operative condition, are configured for directly contacting the folded film at opposite sides.

In a 30th aspect in accordance with the 28th or 29th aspect, at least one from between said first and second tools (11, 12) comprises the at least one heater (5), optionally the at least one conductive strip (6).

In a 31st aspect in accordance with any one of the aspects from the 28th to the 30th the first tool (11) of the welding head (4) comprises:
said support substrate (8) made of electrically insulating material,
the heater (5) arranged, optionally constrained, on the support substrate (8).

In a 32nd aspect in accordance with any one of the aspects from the 28th to the 31st the first tool (11) of the welding head (4) comprises the protective layer (9), optionally arranged to cover the heater (5) and configured to prevent the direct contact of the latter with the film.

In a 33rd aspect in accordance with the preceding aspect the protective layer (9) of the first tool defines an exposed surface of the heater, optionally said protective layer (9) comprises at least one sheet of insulating material which covers the entire surface of the heater (5), optionally of the conductive strip (6).

In a 34th aspect in accordance with any one of the aspects from the 28th to the 33rd the first tool (11) comprises an electrically insulating layer (10) directly in contact with the heater (5) and with the support substrate (8), optionally the electrically insulating layer (10) of the first tool (11) is directly interposed between the conductive strip (6) and the support substrate (8) of said first tool (11).

In a 35th aspect in accordance with any one of the aspects from the 28th to the 34th the second tool (12) of the welding head (4) comprises:
a respective support substrate (8) made of electrically insulating material,
a respective heater (5) arranged, optionally constrained, with the support substrate (8).

In a 36th aspect in accordance with any one of the aspects from the 28th to the 35th the first and the second tool (11, 12) comprise respective heaters (5) facing each other and which, in the second operative condition of the first and second tools (11, 12), are configured for welding the film (2a) to define said container.

In a 37th aspect in accordance with any one of the aspects from the 28th to the 36th the second tool (12) of the welding head (4) comprises a respective protective layer (9) arranged to cover the heater (5) of the second tool, optionally configured to prevent the direct contact of said heater with the film.

In a 38th aspect in accordance with the preceding aspect the protective layer (9) of the second tool defines an exposed surface of the heater (5) of said second tool, optionally said protective layer (9) comprises at least one sheet of insulating material which covers the entire surface of the heater (5) of the second tool (12), optionally of the conductive strip (6).

In a 39th aspect in accordance with any one of the aspects from the 28th to the 38th the second tool comprises a respective electrically insulating layer (10) directly in contact with the heater (5) and with the support substrate (8) of the second tool (12), optionally the electrically insulating layer (10) of the second tool is directly interposed between the conductive strip (6) and the support substrate (8) of the second tool.

In a 40th aspect in accordance with any one of the preceding aspects the supply station (2) comprises:
a reel (13) configured to unwind the film (2a), optionally continuously, according to a flat configuration along an advancement path (A);
at least one folding station (14), arranged downstream of the reel (13) with respect to the advancement path (A), configured to receive the film (2a) being unwound from the reel (13) and fold it to define said folded portion (2b),
the welding head (4) being arranged downstream of the folding station (14) and configured to receive the folded film (2a).

In a 41st aspect in accordance with any one of the preceding aspects the folding station (14) is configured for folding the film to define:
the folded portion (2b) having a substantially "W" shape and defining, optionally following the welding of the film (2a), a bottom portion of the container;
a closure portion (2c) integrally joined with the folded portion (2b) and emerging therefrom, in which the closure portion (2c) defines, following the welding of the film (2a), a top portion of the container.

In a 42nd aspect in accordance with any one of the preceding aspects the apparatus (1) comprises at least one power supplier connected to the welding head (4) and configured to provide electric power to the at least one heater (5) so as to enable the passage within the latter of an electric current flow, optionally the power supplier is configured to provide electric power directly to the conductive strip (6).

In a 43rd aspect in accordance with the preceding aspect the apparatus comprises a control unit (50) active on the power supplier and configured to command the latter and control the supply of electric power to at least the heater (5), said control unit (50) being configured to command the power supplier to carry out a heating cycle comprising the following steps:
applying an electric voltage to the conductive strip (6) of the at least one heater (5) in order to generate a temperature increase of an exposed surface of the welding head (4) so as to bring it to a first temperature;
controlling said electric voltage in order to maintain the exposed surface of the welding head (4) at the first temperature for a first discrete time interval;
reducing or eliminating the voltage applied to the conductive strip (6) of the at least one heater (5) in order to reduce the temperature of the welding head (4) below said first temperature.

In a 44th aspect in accordance with the preceding aspect the first discrete time interval has duration comprised between 0.2 and 5 seconds, in particular between 0.4 and 2 seconds.

In a 45th aspect in accordance with the 43rd or 44th aspect, the at least one heater (5) is maintained under voltage for a time period substantially equal to the first discrete time period.

In a 46th aspect in accordance with any one of the aspects from the 43rd to the 45th the welding head (4) is movable between:
a rest position where it is spaced from the film (2a), and
a welding position in which the welding head (4) contacts the film (2a),
in which the control unit (50) is active commanding the welding head (4) and configured for synchronizing the heating cycle with the welding position.

In a 47th aspect in accordance with the preceding aspect in which the control unit (50) is configured for placing the welding head in the welding position during at least one of the steps of the heating cycle, optionally at least during the step of controlling said electric voltage in order to maintain the exposed surface of the welding head (4) at the first temperature.

In a 48th aspect in accordance with the 46th or 47th aspect the control unit (50) is configured for controlling the welding head (4) in a manner such that—during each heating cycle—said head maintains the welding position at least during said first discrete time interval, optionally up to the end of said first discrete time interval.

In a 49th aspect in accordance with any one of the preceding aspects the film (2a) is in continuous form and extends uninterrupted from the supply station (2) to the welding station (3), the apparatus (1) comprising a cutting station (15) configured to cut the continuous film in order to define a plurality of discrete containers.

In a 50th aspect in accordance with the preceding aspect in which:
the cutting station (15) is part of the welding station (3) and is configured for executing the cutting of the continuous film (2a) welded in proximity to the welding head (4), optionally between the cutting station (15) and the welding station (3) there are no stations for example for processing the film or for filling the container; or
the cutting station (15) is spaced and arranged downstream of the welding station (3) with respect to the advancement path (A) of the film (2a).

In a 51st aspect in accordance with any one of the preceding aspects the apparatus comprises at least one positioning station (16) of the products (P) arranged downstream of the welding station (3), the positioning station (16) being configured for placing at least one product in the housing compartment (101) of at least one container (100).

In a 52nd aspect in accordance with the preceding aspect, the apparatus comprises a preparation station (17) interposed between the welding station (3) and the positioning station (16) for the products (P), the preparation station being configured for gripping and moving away external film flaps of the container so as to define, at the top of the container, an opening for the insertion of the products (P).

In a 53rd aspect in accordance with the 51st or 52nd aspect, the apparatus comprises at least one closure station (18) for the containers (100) arranged downstream of the positioning station (16) of products (P) and configured for sealing the top of the container in order to define a hermetically closed body.

In a 54th aspect in accordance with the preceding aspect the closure station (18) comprises:
a device for inserting at least one cap at the open top of the container,
a welder configured for sealing, optionally welding, opposite flaps of the top of the container together with the cap.

In a 55th aspect in accordance with the 53rd or 54th aspect, the cutting station (15) is:
interposed between the closure station (18) and the positioning station (16) for the products (P), or
arranged downstream of the closure station (18) according to the advancing direction path (A) for the film (2a).

In a 56th aspect in accordance with any one of the aspects from the 43rd to the 55th, the control unit (50) is active commanding the supply station (2) and the welding station (3), said control unit (50) being configured to command the supply station (2) to carry out an advancement cycle comprising the following steps:
moving the film (2a) along the advancement path for a predetermined time interval,
stopping the film (2a) for a respective predetermined time interval,
the control unit being configured for spacing movement steps with stopping steps so as to generate a non-continuous advancing of the film (2a), said control unit (50) being configured to command the welding station (3) to weld the film during the film stop step.

In a 57th aspect in accordance with the preceding aspect the control unit (50) is configured to command the first and the second operative condition of the first and second tools (11, 12) of the welding head (4), the control unit is configured for:
synchronizing the first operative condition of the first and second tools (11, 12) with the film moving step (2a),
synchronizing the second operative condition of the first and second tools (11, 12) with the film stop step (2a).

in a 58th aspect in accordance with any one of the aspects from the 53rd to the 57th the control unit is active commanding the cutting station (15), the positioning station (16), the preparation station (17) and the closure station (18),
in which the control unit is configured for:
commanding the cutting of the film (2a) to the cutting station (15) during the film stop step (2a),
commanding the positioning of at least one product in the housing compartment of a container to the positioning station during the film stop step (2a),
commanding the preparation station (17) to open the container during the film stop step (2a),
commanding the closure station (18) to seal the container during the film stop step (2a).

In a 59th aspect in accordance with any one of the aspects from the 53rd to the 58th the control unit (50), during the film stop step (2a), is configured for synchronizing the welding of the film executed by the welding station (3) with the command of the following stations: cutting station (15), positioning station (16), preparation station (17), closure station (18).

In a 60th aspect, a use of the apparatus (1) is provided in accordance with any one of the preceding aspects for making containers made of folded film, optionally for making stand up pouches.

In a 61st aspect, a method is provided of making containers by means of the apparatus (1) in accordance with any one of the aspects from the 1st to the 59th, said method comprising the following steps:
arranging a film (2a) in continuous form having at least one folded portion (2b) comprising a number of superimposed flaps equal to or greater than 3;
positioning the continuous film (2a) at the welding head (4) of the welding station (3);
welding the continuous film (2a), optionally at least the folded portion (2b) of the film (2a), by means of the welding head (4) in order to define at least one container.

In a 62nd aspect in accordance with the preceding aspect the step of arranging the film comprises the following sub-steps:
unwinding a continuous film from a reel according to a flat configuration,
folding said flat film to define said folded portion (2b) having a number of superimposed film flaps equal to or greater than 3,
in which, following the folding step, the folded portion (2b) has a substantially "W" shape.

In a 63rd aspect in accordance with the 61 or 62nd aspect the welding step comprises at least one step of placing the welding head (4) in contact with the film (2a), optionally at least with the folded portion (2b) of the film.

In a 64th aspect in accordance with any one of the aspects from the 61st to the 63rd the welding step comprises at least the following sub-steps:

placing the first and the second tool (11, 12) of the welding head in the first operative condition in which the tools are spaced from each other, arranging the film between said first and second tools arranged in the first operative condition, placing the first and second tools (11, 12) of the welding head (4) in the second operative condition so that said tools can act by pressing on the film arranged interposed between the latter, applying, optionally during the step in which said first and second tools are in the second operative condition, an electric voltage to the conductive strip (6) of the at least one heater (5) of at least one between the first and second tools (11, 12) to generate a temperature increase of an exposed surface of the welding head (4) in order to bring it to a first temperature so as to enable the welding of the film and the obtainment of said container, following the welding of the film, arranging the first and the second tool (11, 12) in the first operative condition, moving said container together with the continuous film along the advancement path exiting from the welding head.

In a 65th aspect in accordance with the preceding aspect in which, during the welding, at least during the sub-step in which said first and second tools (11, 12) are in the second operative condition, the method provides for: maintaining the electric voltage to the conductive strip of at least one of said tools in order to maintain the exposed surface of the welding head (4) at the first temperature for a first discrete time interval.

In a 66th aspect in accordance with the preceding aspect the first discrete time interval has a duration comprised between 0.2 and 5 seconds, in particular between 0.4 and 2 seconds.

In a 67th aspect in accordance with any one of the aspects from the 61st to the 66th, the heater (5) is maintained under voltage for a time period substantially equal to the first discrete time period.

In a 68th aspect in accordance with any one of the aspects from the 61st to the 67th in which, following the obtainment of a container by means of the welding step, the method comprises a step of reducing or eliminating the voltage applied to the conductive strip (6) of at least one of said tools (11, 12) to reduce the temperature of the welding head (4) below said first temperature, in which such step of reduction or canceling of the voltage is executed:
  when said first and second tools are in the second operative condition; or
  when said first and second tools are moving from the second to the first operative condition; or
  when said first and second tools are in the first operative condition.

In a 69th aspect in accordance with any one of the aspects from the 61st to the 68th in which the welding of the film to make said container is executed by means of a single step of contact of the welding head (4) with the film (2a).

In a 70th aspect in accordance with any one of the aspects from the 61st to the 69th in which the welding step forms at least one container comprising:
  a bottom portion defined by the folded portion (2b) of the film;
  a top portion (2c) integrally joined with the bottom portion and emerging from the latter, the top portion defining an opening delimited by a free edge configured for allowing the insertion of at least one product in the container, in which the welding on the bottom portion and on the top portion has a substantially "I" or "U" or "[ ]" shape.

In a 71st aspect in accordance with any one of the aspects from the 61st to the 70th the method comprises at least one step of cutting the continuous film (2b) exiting from the welding station (3) so as to define discrete containers.

In a 72nd aspect in accordance with any one of the aspects from the 61st to the 71st the method comprises a step of filling of the containers, by means of at least one product (P), exiting from the welding station.

In a 73rd aspect in accordance with the preceding aspect the method comprises a step of hermetic closure of the container executed following the step of filling the latter, said hermetic closure step comprising at least one further step of welding of the film at the top portion of the container.

BRIEF DESCRIPTION OF THE DRAWINGS

Several embodiments and several aspects of the finding will be described hereinbelow with reference to the enclosed drawings, provided only as a non-limiting example in which:

FIGS. 2A and 2B are respective top views of embodiment variants of an apparatus for making containers in accordance with the present invention;

FIG. 3 is a sectional schematic view of a container obtainable by means of the apparatus and the method in accordance with the present invention;

FIGS. 4 and 5 schematically show different operations steps of a welding head of an apparatus in accordance with the present invention;

FIGS. 6 and 7 are respective perspective views of a first and second tools of a welding head of an apparatus in accordance with the present invention;

FIG. 8 is a sectional view schematically illustrating a welding head of an apparatus in accordance with the present invention during a step of welding a folded sheet material;

FIG. 9 is a schematic figure of a container, in particular a bag, obtainable by means of the apparatus and the method in accordance with the present invention.

CONVENTIONS

Figure 1:
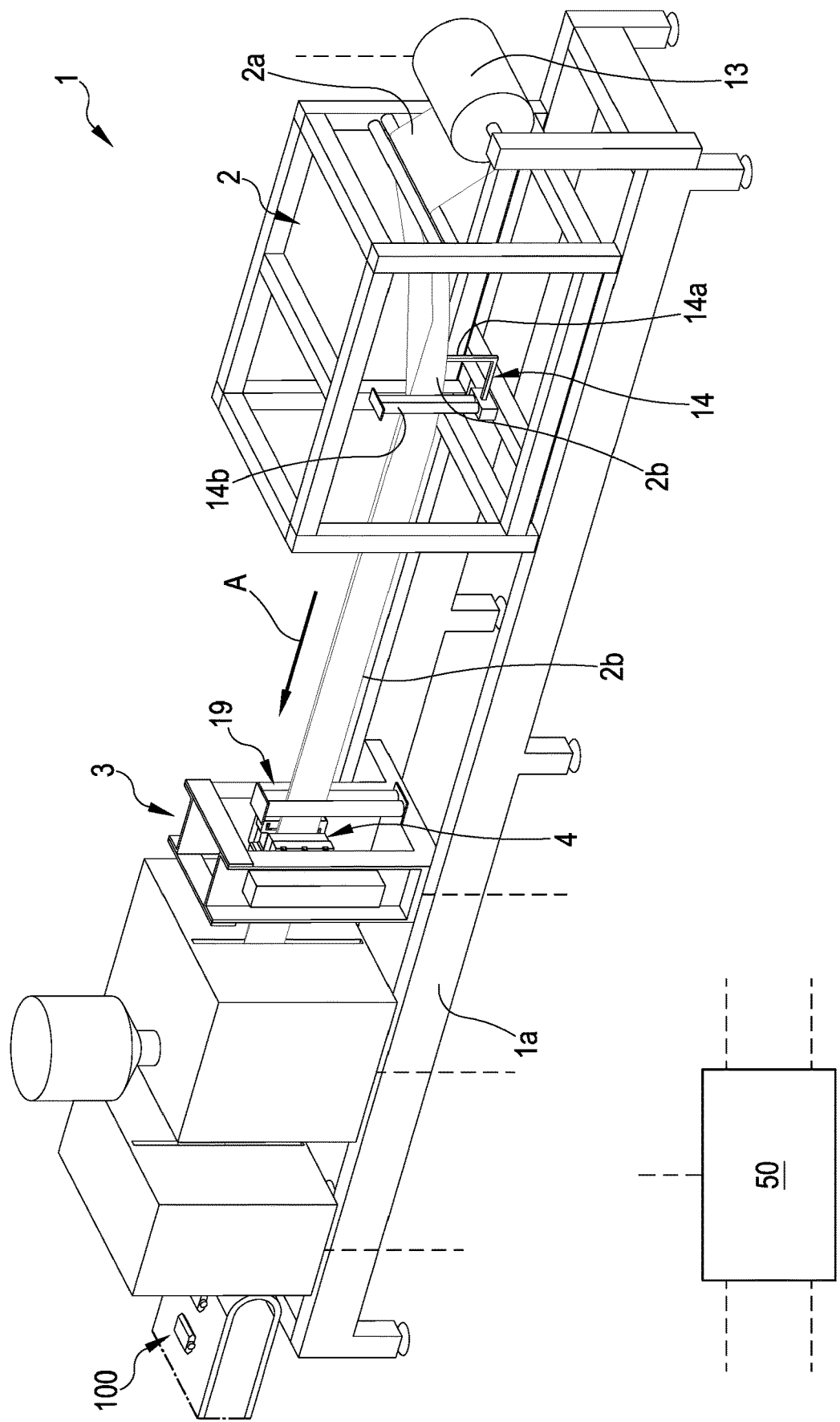
FIG. 1 is a perspective view of an apparatus for making containers in accordance with the present invention.

It should be noted that in the present detailed description, corresponding parts illustrated in the various figures are indicated by the same reference numerals. The figures may illustrate the object of the invention by representations that are not in scale; therefore, parts and components illustrated in the enclosed figures relating to the object of the invention may relate solely to schematic representations.

The terms upstream and downstream refer to a direction or trajectory of advancement of a container along a predetermined path defined starting from a supply station for supplying a film for the obtainment of said container, through a welding station and then up to a closure station for the containers.

Definitions

Control Unit

The packaging apparatus described and claimed herein comprises at least one control unit designed to control the operations performed by the apparatus. The control unit can clearly be only one or be formed by a plurality of different control units according to the design choices and the operational needs.

The term control unit means an electronic component which can comprise at least one of: a digital processor (for example comprising at least one selected from the group of: CPU, GPU, GPGPU), a memory (or memories), an analog circuit, or a combination of one or more digital processing units with one or more analog circuits.

The control unit can be configured or programmed to perform some steps: this can be done in practice by any means that allows configuring or programming the control unit. For example, in the case of a control unit comprising one or more CPUs and one or more memories, one or more programs can be stored in appropriate memory banks connected to the CPU or to the CPUs; the program or programs contain instructions which, when executed by the CPU or the CPUs, program or configure the control unit to perform the operations described in relation to the control unit. Alternatively, if the control unit is or comprises analog circuitry, then the control unit circuit may be designed to include circuitry configured, in use, for processing electrical signals so as to perform the steps related to the control unit. The control unit may comprise one or more digital units, for example of the microprocessor type, or one or more analog units, or a suitable combination of digital and analog units; the control unit can be configured for coordinating all the actions necessary for executing an instruction and sets of instructions.

Actuator

The term actuator means any device capable of causing movement on a body, for example on a command of the control unit. The actuator can be of an electric, pneumatic, mechanical (for example with a spring) type, or of another type.

Carbon Structure

The carbon structure refers to a structure with electrically conductive capacity. The electrically conductive carbon structure comprises (or is exclusively formed by) one or more carbon allotropes selected from among:
- graphite;
- monolayer or multilayer graphene;
- fullerene, in which the carbon atoms are bonded together in spherical, tubular, fibrous or ellipsoidal formations. In particular, said fullerene can take on the form of carbon nanotubes or carbon nanofibers.

The heater 5, in particular the conductive strip 6, described hereinbelow can be constituted by an electrically conductive carbon structure completely formed in one or more above-described carbon allotropes. For example, the heater 5, in particular the conductive strip 6, can be exclusively formed of graphite, or it can be exclusively formed of a single graphene layer, or exclusively formed of a plurality of graphene layers which are superimposed on each other, or it can be exclusively formed of a fullerene structure of carbon nanotubes, or it can be formed of a fullerene structure of carbon nanofibers, or it can be exclusively formed by a combination of one or more carbon nanofibers.

According to a further variant, the electrically conductive carbon structure can comprise:
- a structure formed by contiguous carbon filaments which are in contact with each other in order to form a conductive body, or
- carbon filaments incorporated in a plastic resin matrix: in the latter case, the carbon filaments can be situated in an adjacent position and electrically connected to each other in prescribed sections, such as at the ends thereof, or
- carbon particles incorporated in a plastic resin matrix and defining a conductive body.

Depending on the specific structure and on the technology employed by the manufacturer, the carbon structure can be applied in various ways on a support (support substrate) in order to form a heater: for example, a band or a layer or a filament of carbon structure can be glued on a support; or a band or a layer or a filament can be formed starting from particles deposited on a support (e.g. nebulized or painted), or the carbon structure of any one of the abovementioned structures could be incorporated in a resin matrix during production (e.g. incorporated in a reinforced resin matrix).

Product

The term product P indicates an article or a composite of articles of any nature. For example, the product can be of food type and be in solid state (e.g. powder or particulate), liquid or in gel form, i.e. in the form of two or more of the aforesaid aggregation states. In food field, the product can comprise: drinks, cheese, treated meats, ready meals and frozen meals of various type.

Container

The term container 100 indicates a body made of folded sheet material defining a housing compartment 101 (internal volume) in which at least one product P can be housed. The container can be made of at least one of the following sheet materials: weldable plastic, aluminum, paper material, plant fibers, or a combination thereof. In detail, the container 100 can comprise at least one film 2a made of plastic material laminated with at least one aluminum film. The container 100 comprises a folded bottom portion 2b having a number of film flaps superimposed on each other—such number of film flaps equal to or greater than 3. In particular, the bottom portion comprises four superimposed film flaps defining a "W" shape; two sheet flaps are extended as an extension from the bottom portion 2b, such flaps facing each other in order to define a top portion 2c of the container. The bottom portion 2b and the top portion 2c delimit the housing compartment 101 (internal volume) of the container 100; the top portion can be sealed and at such seal a cap can be applied for the closure/dispensing of the product present in the container. The term container 100 indicates a package, a bag or a pack, e.g. a stand up pouch, set to receive and contain at least one product.

Stand Up Pouch

The term stand up pouch indicates a container with bottom attained by folding a sheet, generally "W" shaped, subsequently welded. The welding stiffens the bottom, which is capable of maintaining the container in vertical position. This type of container (packages, bags or packs) are used for packing food products (coffee, tea, spices, dried fruit, fruit juices, mayonnaise, candy, etc.), seeds, chemical products, tobacco.

Film

The film 2a can be at least partly made of at least one of the following materials: plastic, in particular polymer material, aluminum, paper material, plant fibers, or a combination thereof. The film 2a can be made of flexible multilayer material comprising: one or more heat-weldable layers, one or more gas barrier layers, one or more light barrier layers, one or more heat resistant layers. The film can be used for obtaining vacuum containers, under controlled atmosphere (MAP) or natural atmosphere (non-modified atmosphere).

Suitable polymers for the heat-sealable layer can be ethylene homo- and copolymers, such as LDPE, ethylene/alpha-olefin copolymers, ethylene/acrylic acid copolymers, ethylene/methacrylate acid copolymers or ethylene/vinyl acetate copolymers or ethylene/vinyl acetate copolymers, ionomers, co-polyesters, for example PETG. Preferred materials for the heat-sealable layer are LDPE, ethylene/alpha-olefin copolymers, e.g. LLDPE, ionomers, ethylene/vinyl acetate copolymers and mixtures thereof.

Depending on the product to be packaged, the film may comprise a gas barrier layer. The gas barrier layer typically comprises oxygen-impermeable resins such as PVDC, EVOH, polyamides and mixtures of EVOH and polyamides. Typically, the thickness of the gas barrier layer is set to provide the film with an oxygen transmission rate of 23° C. and 0% relative humidity of, less than 100 $cm^3/m^2*m^2*atm$, preferably less than 50 $cm^3/(m^2*day*atm)$, when measured in accordance with ASTM D-3985.

Common polymers for the heat-resistant layer are, for example, ethylene homo- or copolymers, in particular HDPE, ethylene copolymers and cyclic olefins, such as ethylene/norbornene copolymers, propylene homo- or copolymers, ionomers, polyesters, polyamides.

The film can also comprise other layers such as adhesive layers, filling layers and the like to provide the thickness necessary for the film and improve its mechanical properties, such as puncture resistance, abuse resistance, formability and the like. The film can be obtained by means of:

any one suitable co-extrusion process, through a flat or circular extrusion head, preferably by means of co-extrusion or by means of hot blowing;

any one processing laminating at least one first film or films of single-layer or multilayer material with at least one second film of single-layer or multilayer material. The lamination of two or more films of single-layer or multilayer material can be provided for.

Heat-shrinkable films show a free shrinking value at 120° C. (value measured in accordance with ASTM D2732, in oil) in the range from 2% to 80%, normally from 5% to 60%, in particular from 10% to 40% in both longitudinal and transverse directions. Heat-curable films normally have a shrinkage value of less than 10% at 120° C., normally less than 5% both in the transverse and longitudinal direction (measured in accordance with the ASTM D2732 method, in oil).

The welding layer typically comprises a heat-sealable polyolefin which in turn comprises a single polyolefin or a mixture of two or more polyolefins such as polyethylene or polypropylene or a mixture thereof. The welding layer may also be provided with anti-fogging properties through known techniques, for example by incorporation in its composition of anti-fogging additives or through a coating or a spraying of one or more anti-fogging additives that counteract the fogging on the surface of the welding layer. The welding layer may also comprise one or more plasticizers. The welding layer may comprise polyesters, polyamides, polyolefins or a mixture of polyamide and polyester. In some cases, the films comprise a gas barrier layer. Barrier films normally have an oxygen transmission rate, also called OTR (Oxygen Transmission Rate) below 200 $cm^3/(m^2*day*atm)$ and more frequently below 80 $cm^3/(m^2*day*atm)$ evaluated at 23° C. and 0% RH measured in accordance with the ASTM D-3985 method. The barrier layer is normally made of a thermoplastic resin selected from a saponified or hydrolyzed product of ethylene-vinyl acetate copolymer (EVOH), an amorphous polyamide and vinyl-vinylidene chloride and mixtures thereof or aluminum. Some materials comprise an EVOH barrier layer, layered between two polyamide layers. In some applications, the film does not comprise any gas barrier layer. These films usually comprise one or more polyolefins as defined herein.

These films usually comprise one or more polyolefins as defined herein. Non-gas barrier films normally have an OTR (evaluated at 23° C. and 0% RH in accordance with ASTM D-3985) of 100 $cm^3/(m^2*day*atm)$ up to 10000 $cm^3/(m^2*day*atm)$, more often up to 6000 $cm^3/(m^2*day*atm)$.

Peculiar compositions based on polyester are those used for the films of containers (packages), so-called ready-meals. For these films, the polyester resins of the film may constitute at least 50%, 60%, 70%, 80% and 90% by weight of the film.

The film can be single-layer. The typical composition of single-layer films comprises polyesters as defined herein and mixtures thereof or polyolefins as defined herein and mixtures thereof.

In all the layers of the films described herein, the polymeric components may contain suitable amounts of additives normally included in such compositions. Some of these additives are normally included in the outer layers or in one of the outer layers, while others are normally added to the inner layers. These additives comprise slipping or anti-blocking agents such as talc, waxes, silica and the like, or antioxidant agents, stabilizers, plasticizers, fillers, pigments and dyes, cross-linking inhibitors, cross-linking agents, UV absorbers, odor absorbers, absorbers of oxygen, bactericides, antistatic agents, antifog agents or compositions and similar additives known to the man skilled in the art of packaging.

The films may have one or more holes adapted to allow the fluid communication between the inner volume of the package and the external environment, or, in the case of a food product, allow the packaged food to exchange gas with the outside; the perforation of the films can, for example, be performed by means of a laser beam or mechanical means, such as rollers provided with needles. The number of perforations applied and the size of the holes influence the permeability to the gases of the film itself. Micro-perforated films are usually characterized by OTR values (evaluated at 23° C. and 0% RH in accordance with ASTM D-3985) of 2500 $cm^3/(m^2*day*atm)$ up to 1000000 $cm^3/(m^2*day*atm)$. Macro-perforated films are usually characterized by OTR values (evaluated at 23° C. and 0% RH in accordance with ASTM D-3985) higher than 1000000 $cm^3/(m^2*day*atm)$.

The film can also have at least one easy to open frangible or peelable layer which can be positioned adjacent a heat-sealable layer to facilitate the opening of the final packaging. A method of measuring the strength of a weld, herein referred to as a "welding force", is described in ASTM F-88-00. Acceptable welding force values to have a peelable weld are between 100 g/25 mm and 850 g/25 mm, 150 g/25 mm to 800 g/25 mm, 200 g/25 mm to 700 g/25 mm.

The film, or only one or more of its layers, can be crosslinked in order to improve, for example, the force of the film and/or the heat resistance when the film is brought in contact with a heating plate during the welding process. The crosslinking can be obtained by means of the use of chemical additives or by subjecting the film layers to an energy radiation treatment, such as a treatment with high-energy electron beam, in order to induce the crosslinking between molecules of the irradiated material. Films suitable for this application preferably have a thickness in the range between 50 μm and 200 μm, between 70 μm and 150 μm.

The film can be obtained from co-extrusion and lamination processes. The film can have a symmetric or asymmetric structure and can be single-layer or multilayer. The multilayer films are composed of at least two layers, more frequently by at least five layers, often by at least seven layers. Generally the total thickness of the film varies from 3 µm to 100 µm, normally it ranges from 5 µm to 50 µm, and often it ranges from 10 µm to 30 µm.

Material Specifications

PVDC is any vinylidene chloride copolymer in which a prevalent amount of the copolymer comprises vinylidene chloride and a lower amount of the copolymer comprises one or more unsaturated monomers copolymerizable therewith, typically vinyl chloride and alkyl acrylates or methacrylates (for example methyl acrylate or methacrylate) and mixtures thereof in different proportions.

The term EVOH includes saponified or hydrolyzed ethylene-vinyl acetate copolymers and refers to ethylene/vinyl alcohol copolymers having an ethylene co-monomer content preferably composed of a percentage of from about 28 mole % to about 48 mole %, more preferably from about 32 mole % and about 44 mole % of ethylene and even more preferably, and a saponification degree of at least 85%, preferably at least 90%.

The term polyamides is meant to indicate homo- and co- or ter-polymers. This term specifically includes aliphatic polyamides or co-polyamides, e.g. polyamide 6, polyamide 11, polyamide 12, polyamide 66, polyamide 69, polyamide 610, polyamide 612, copolyamide 6/9, copolyamide 6/10, copolyamide 6/12, copolyamide 6/66, copolyamide 6/69, aromatic and partly aromatic polyamides or copolyamides, such as polyamide 6I, polyamide 6I/6T, polyamide MXD6, polyamide MXD6/MXDI, and mixtures thereof.

The term polyesters refers to polymers obtained from the polycondensation reaction of dicarboxylic acids with dihydroxylic alcohols. Suitable dicarboxylic acids are, for example, terephthalic acid, isophthalic acid, 2,6-naphthalene dicarboxylic acid and the like. Suitable dihydroxylic alcohols are for example ethylene glycol, diethylene glycol, 1,4-butanediol, 1,4-cyclohexanodimethanol and the like. Examples of useful polyesters include poly(ethylene terephthalate) and copolyesters obtained by reaction of one or more carboxylic acids with one or more dihydroxylic alcohols.

The term copolymer means a polymer derived from two or more types of monomers and includes terpolymers. Ethylene homo-polymers include high density polyethylene (HDPE) and low density polyethylene (LDPE). Ethylene copolymers include ethylene/alphaolefin copolymers and ethylene/unsaturated ester copolymers. The ethylene/alpha-olefin copolymers generally include copolymers of ethylene and one or more co-monomers selected from alpha-olefins having between 3 and 20 carbon atoms, such as 1-butene, 1-pentene, 1-hexene, 1-octene, 4-methyl-1-pentene and the like.

Ethylene/alpha-olefin copolymers generally have a density in the range of from about 0.86 $g/cm^3$ to about 0.94 $g/cm^3$. It is generally understood that the term linear low density polyethylene (LLDPE) includes that group of ethylene/alpha-olefin copolymers which fall in the density range of between about 0.915 $g/cm^3$ and about 0.94 $g/cm^3$ and in particular between about 0.915 $g/cm^3$ and about 0.925 $g/cm^3$. Sometimes, linear polyethylene in the density range between about 0.926 $g/cm^3$ and about 0.94 $g/cm^3$ is referred to as linear medium density polyethylene (LMDPE). Lower density ethylene/alpha-olefin copolymers may be referred to as very low density polyethylene (VLDPE) and ultra-low density polyethylene (ULDPE). Ethylene/alpha-olefin copolymers can be obtained with heterogeneous or homogeneous polymerization processes. Another useful ethylene copolymer is an unsaturated ethylene/ester copolymer, which is the ethylene copolymer and one or more unsaturated ester monomers. Useful unsaturated esters include vinyl esters of aliphatic carboxylic acids, in which esters have between 4 and 12 carbon atoms, such as vinyl acetate, and alkyl esters of acrylic or methacrylic acid, in which esters have between 4 and 12 carbon atoms. Ionomers are copolymers of an ethylene and an unsaturated mono-carboxylic acid having the carboxylic acid neutralized by a metal ion, such as zinc or, preferably, sodium. Useful propylene copolymers include propylene/ethylene copolymers, which are copolymers of propylene and ethylene having a percentage by weight content mostly of propylene and propylene/ethylene/butene ter-polymers, which are copolymers of propylene, ethylene and 1-butene.

The term paper material means paper or cardboard, optionally having at least 50% by weight, preferably at least 70% by weight of organic material comprising one or more of cellulose, hemicellulose, lignin, lignin derivatives. The sheet material that can be used to make the film can have a basis weight of between 5 $g/m^2$ and 700 $g/m^2$, in particular between 70 $g/m^2$ and 130 $g/m^2$.

DETAILED DESCRIPTION

Apparatus 1

Reference number 1 overall indicates an apparatus for making containers of products P and specifically for making so-called stand up pouches. The apparatus 1 comprises a frame 1a defining a base body of the apparatus 1 supporting the various components described hereinbelow.

The apparatus 1 comprises a supply station 2 (FIGS. 1-3) for supplying a film 2a having at least one folded portion 2b defining a number of film flaps folded and superimposed with respect to each other equal to or greater than 3. The supply station 2 comprises a reel 13 (FIGS. 1-3)—idle or moved by an electric motor—configured to continuously unwind the film 2 according to a flat configuration along an advancement path A. The supply station 2 also comprises a folding station 14 (FIG. 1) configured to receive the continuous film 2a being unwound from the reel 13 and fold it to define said folded portion 2b. The reel 13 and the folding station 14 are constrained to the frame 1a and placed one after the other along the advancement path A of the film 2a (FIG. 1).

The folding station 14 comprises a pusher 14a (FIG. 1) arranged immediately downstream of the reel 13 and configured for folding the flat film 2a at a longitudinal centerline portion of the film 2a; the folding station 14 also comprises a crushing device 14b arranged immediately downstream of the pusher 14a configured for compressing and defining the folded form of the film 2a. The crushing device 14b can comprise a pair of facing plates or a pair of approached rollers defining a narrow passage for the film 2a such to define fold lines on the sheet. As a function of the distance between the pusher 14a and the crushing device 14b, as well as a function of the insertion mode (passage) of the film 2a in the crushing device 14b, it is possible to define the form of the folded portion 2b of the film 2a. FIG. 3 illustrates a possible shaping of the film 2a comprising a folded portion 2b substantially "W" shaped in which four film flaps are present which are superimposed on each other; from the pair of external flaps of the folded portion 2b, respective film flaps emerge as an extension that are adapted to define a top portion 2c of the film 2a: the top portion 2a is defined by only two facing film flaps 2a that are integrally joined to the external flaps of the folded portion (FIG. 3).

Exiting from the folding station 14, the film 2a, constituted by the folded portion 2b and by the top portion 2c, delimits a seat open at the top that is adapted to receive at least one product P: the folded portion 2b defines a closed bottom while the top portion delimits an opening adapted to enable the insertion of at least one product. Interposed between the reel 13 and the folding station 14, it is possible to provide for a sterilization station 20 (FIG. 2A) configured for disinfecting the film unwound on the plane before the same is folded on itself. In particular, the sterilization station 20 is configured for treating the surface of the film which, following the folding, defines an internal surface of the folded film.

Figure 2A:
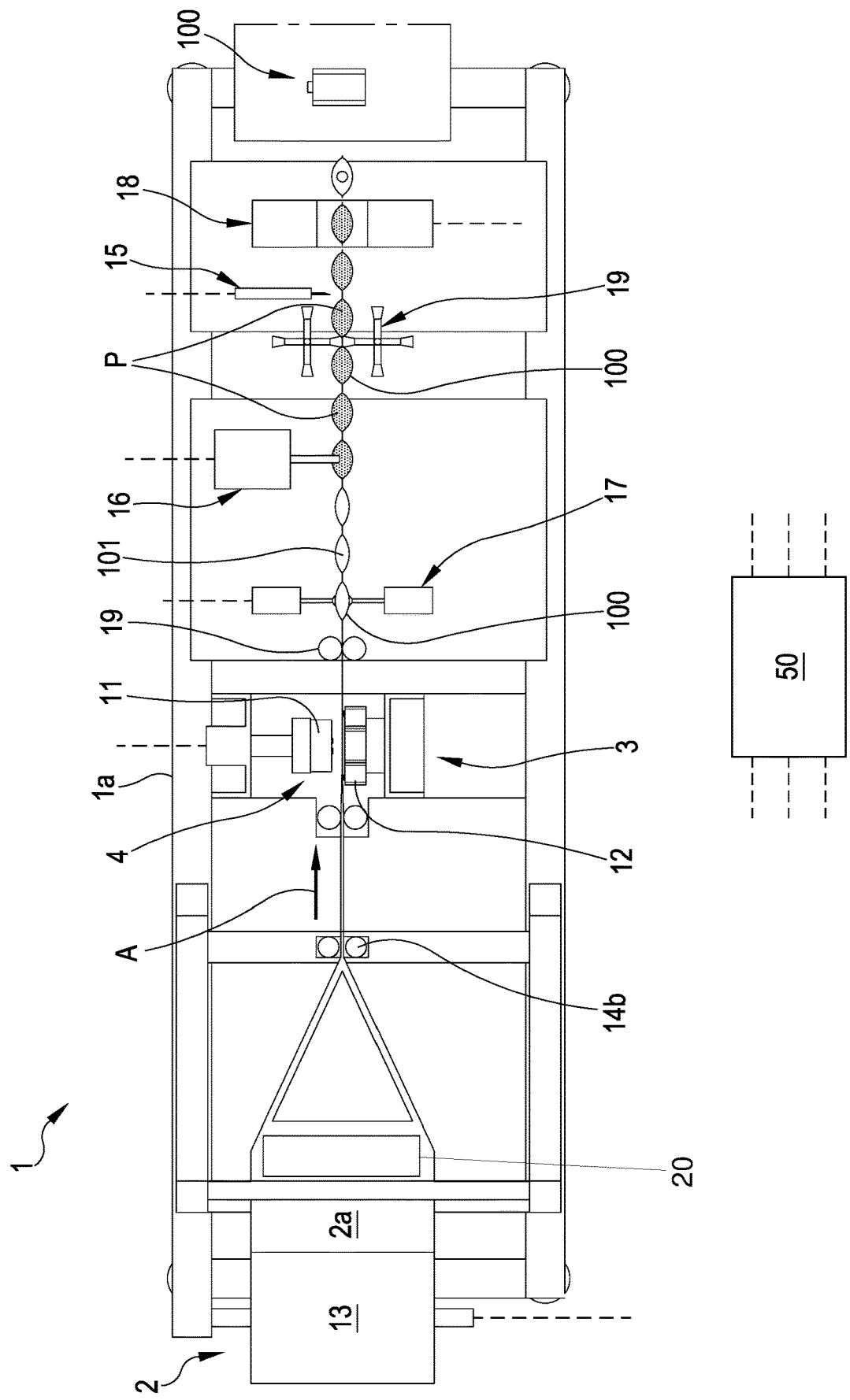

As is visible from FIGS. 1-2B, the apparatus 1 also comprises a driving group 19, placed downstream of the supply station 2, configured for pulling/stretching the film 2a in order to allow the unwinding thereof from reel 13. The driving group 19 can comprise a single pulling/stretching device or, as illustrated for example in FIG. 2A, it can comprise a plurality of said pulling/stretching devices distributed along the advancement path A so as to generate a uniform pulling/stretching of the film 2a along the entire path A.

The pulling/stretching devices can comprise drive rollers, catenaries, grip plates. Each pulling/stretching device can be driven by an electric motor controlled by a control unit 50; due to the control of the electric motors of the drive group and/or of the supply station, the control unit 50 is configured to command the movement of the film 2a along the advancement path A. In detail, the control unit 50 is configured for managing the electric motors of each pulling/stretching device of the driving group 19 in order to adjust the moving speed of the film 2a along said path A. If the reel 13 is moved by an electric motor, the control unit 50 is connected to the motors of the driving group 19 and to the motor of the reel 13 and is configured for synchronizing the activation of said motors in a manner such that the film 2a, in unrolling from the reel 13, is correctly stretched.

In more detail, the control unit 50 is active commanding the supply station 2 and the driving group 19 and is configured to define an advancement cycle of the film comprising the following steps:
  moving the film 2a along the advancement path A for a predetermined time interval,
  stopping the film 2a for a respective predetermined time interval.

The control unit 50 is configured for spacing the movement steps with stop steps so as to generate a discontinuous advancing of the film 2a. In other words, the control unit 50 is configured to command a discontinuous advancing of the film according to predefined advancing pitches: each step of moving the film 2a is followed by a stop step. In this manner, as better described hereinbelow, the components of the apparatus 1 can precisely execute various operations on the film 2a during the stop step of the latter.

The apparatus 1 comprises a welding station 3 arranged downstream of the supply station 2; the welding station 3 is configured to receive and weld the folded film 2a exiting from the folding station 14. As is visible in FIG. 2A, the driving group 19 can be arranged downstream of the welding station 3 with respect to the advancement path A of the film 2a; the driving group is configured for pulling/stretching the welded continuous film 2a exiting from the welding station 3 and allowing the unwinding thereof from reel 13.

In an embodiment variant of the apparatus better detailed hereinbelow, the driving group 19 is positioned upstream of the welding station 3 (FIGS. 1 and 2B) in a manner such that the same can push and possibly guide the continuous film in entering the welding station 3.

The welding station 3 comprises at least one welding head 4 configured to contact and weld the folded film 2a in order to form a container 100 defining a housing compartment 101 for at least one product P. The welding head 4 comprises a heater 5 at least partly made of electrically conductive material having, at least in a predetermined temperature range, an electrical resistivity which decreases upon the increase of the temperature of the same electrically conductive material.

In detail, the electrically conductive material of the heater 5 comprises at least one selected in the group from among: a carbon structure; a structure made of semiconductor material; a structure made of dielectric material. In case of electrically conductive material having a carbon structure, the same comprises or is exclusively formed by one or more carbon allotropes selected from among:
  graphite;
  monolayer or multilayer graphene;
  fullerene, in which the carbon atoms are bonded in spherical, tubular, fibrous or ellipsoidal formations, optionally said fullerene takes the shape of carbon nanotubes or carbon nanofibers;
  optionally the carbon structure is exclusively formed by one or more graphene layers.

Due to the characteristic of the heater 5 (with a resistivity that decreases upon the increase of the temperature of the electrically conductive material), this is capable of providing greater energy to the film 2a in the folded portion with respect to the energy provided to the top portion. Indeed, due to the particular progression of the resistivity of the heater 5, this—when in contact with the film 2a for executing the welding—is essentially cooled due to the contact of the film (transfer of heat in the passage from the higher-temperature body to the lower-temperature body) which absorbs heat from the heater 5. Nevertheless, due to the thickness difference of the film 2a, the folded zone 2b with greater thickness (three or four superimposed film flaps 2a) with respect to the top zone 2c (only two superimposed film flaps 2a) will absorb more heat: in this manner, the heater portion 5 in contact with said folded zone 2b will be cooled more than the heater portion 5 in contact with the top portion 2c. The heater portion 5 in contact with the folded portion 2b, due to the decreasing progression of the resistivity with the increase of the temperature, will define a resistance (ohm) that is greater than the resistance defined by the same heater in contact with the top portion 2c. In this manner, the heater is capable of providing more heat to the zones of the film that more greatly require it for the welding of the film 2a; in substance the heater 5 is capable of being self-regulated as a function of the material (film) to be welded and provide more heat to the zones with greater energy absorption. Due to the specific structure of the heater 5, the welding station 3 is capable of correctly sealing the film 2a by means of only one welding step, or a single contact of the welding head 4 with the film 2a. In other words, the apparatus 1, object of the present invention, by means of one single welding head 4 adapted to act only once on the same film portion 2a is capable of ensuring a correct welding of the film 2a without the same welding having to be "redone" in other steps. It is also indicated that the above-described structure of the heater 5 (the welding station 3) renders the welding head highly flexible in its use: indeed, the same heater 5, due to the capacity of self-regulation of the provided heat, can be employed for welding different types of film 2a, also different with regard to shape and thickness.

Structurally, the heater 5 comprises a conductive strip 6 of a single body having a flat and elongated shape, extended seamless between a first and a second terminal 6a, 6b (FIGS. 6 and 7). The conductive strip 6 has a constant thickness along the entire extension thereof and defines a substantially "I" or "U" or "⌊ ⌉" shape. Nevertheless, it is possible to attain a curved conductive strip and/or having a variable thickness along the extension thereof.

The conductive strip 6 is supported by a substrate 8 made of electrically insulating material of the same welding head 4; the support substrate 8 comprises a flat monolithic plate made of insulating material capable of resisting the temperatures reached during the welding step, e.g. made of at least one selected from the group between the following materials: glass fiber, cotton, aramid fiber, phenol resin, acrylic resin, epoxy resin. Any non-conductive composite material capable of working at temperatures comprised between 50 and 300° C.

The conductive strip 6 is constrained to a contact surface 8a of the support substrate 8. The welding head 4 can also comprise at least one protective layer 9 (FIG. 8B) arranged to cover the conductive strip 6 and configured to prevent the direct contact of the latter and the film. The heater 5, in particular the conductive strip 6, is interposed between the substrate 8 and the protective layer 9. In other words, the protective layer 9, if present, defines the exposed element of the welding head 4 and the heating surface configured to contact directly the film 2a The protective layer 9 comprises at least one sheet of insulating material which covers the entire surface of the heater 5, optionally of the conductive strip 6.

The welding head 4 can also comprise at least one electrically insulating layer 10 (FIGS. 8C, 8D) directly in contact with the conductive strip 6 and with the support substrate 8; the electrically insulating layer 10 can be employed if it uses a support substrate made of conductive material: the layer 10 electrically insulates the conductive strip 6 and the substrate 8.

Figure 8A:
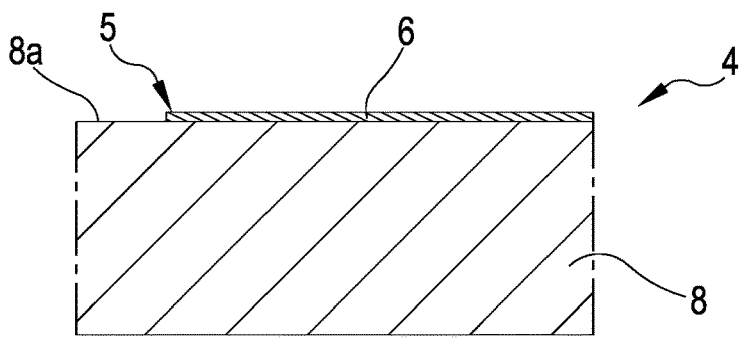
FIGS. 8A-8D are schematic sectional views illustrating different configurations of the welding head of an apparatus in accordance with the present invention.
Figure 8B:
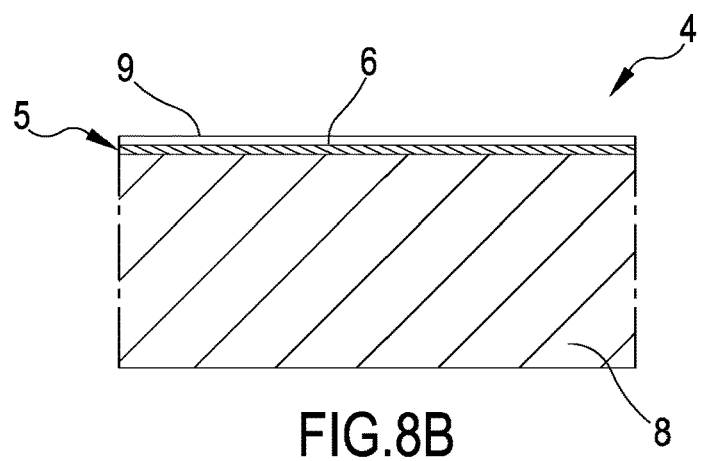
Figure 8C:
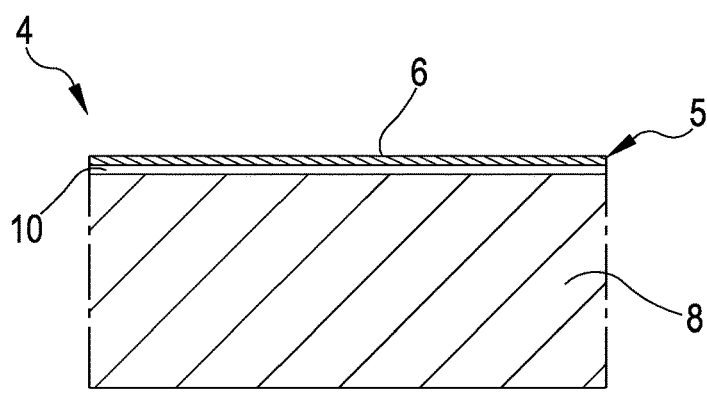
Figure 8D:
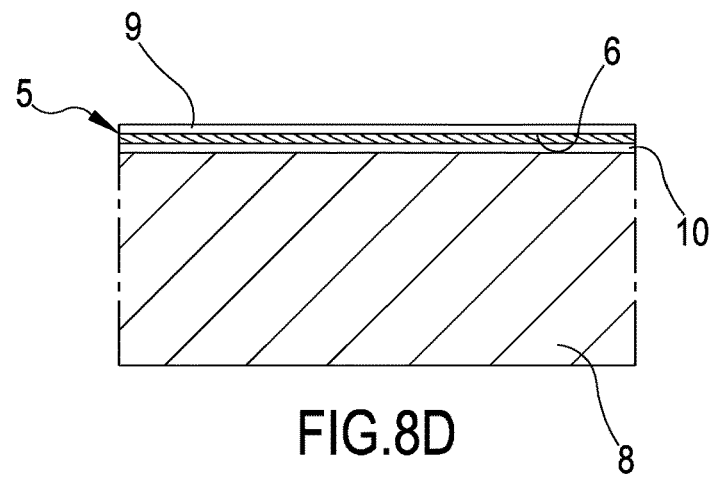

FIGS. 8A and 8D schematically illustrate in section different types of welding head 4 constituted by:
- the substrate 8 carrying the conductive strip 6 (FIG. 8A);
- the substrate 8 carrying the conductive strip 6 which is coated by means of the protective layer 9 (FIG. 8B);
- the substrate 8 covered by an insulating layer 10 directly supporting the conductive strip 6 (FIG. 8C);
- the substrate 8 covered by an insulating layer 10 directly supporting the conductive strip 6 which is coated by means of a protective layer 9 (FIG. 8D).

In more detail, the welding head 4 comprises a first and a second tool 11, 12 (FIGS. 2A, 2B, 4-7) that are movable with respect to each other at least between:
- a first operative condition in which the tools 11, 12 are spaced from each other and are configured to enable the positioning at least of the film 2a between said tools 11, 12;
- a second operative position in which the tools 11, 12 are approached to each other and configured for enabling the welding of the folded film 2a in order to define said container.

In detail, the first and the second tool are both movable relative to the frame 1a by means of respective actuators, e.g. hydraulic. The actuators are connected and managed by the control unit 50 which is configured to command said first and second operative condition of the first and second tools 11, 12.

Each of said tools 11, 12 comprises a heater 5, optionally the conductive strip 6. In detail each of said first and second tools 11, 12 comprises the substrate 8 carrying the conductive strip 6, the protective layer 9 and optionally the insulating layer 10.

In this case, both the tools 11, 12 have heating capacity and hence are able to heat-seal the film 2a. It is however possible to arrange the heater 5, in particular the conductive strip 6, only on one of said first and second tools 11, 12. For example, the first tool 11 can comprise said heater 5 while the second tool is adapted to define a contrast element, e.g. made of rubber, adapted to support the film during the welding thereof which occurs due to the heater of the first tool 11; in this variant, the welding is of mono-active type since it is directly executed by one of said tools 11, 12.

The control unit 50 is active on the respective actuators of the tools 11, 12 and is configured for synchronizing the second operative condition of the first and second tools 11, 12 with the film 2a stop step. In fact, the control unit 50 is configured for managing the supply station 2, the driving group 19 and the actuators of the first and second tools 11, 12 such that said first and second tools are arranged in the approached condition (second operative condition) for welding the film 2a during the film stop condition: the welding is executed with film stopped. The control unit 50 is also configured for synchronizing the first operative condition of the first and second tools 11, 12 with the film 2a moving step; the film 2a is moved through the first and second tools when spaced from each other (first operative condition) in a manner such that the film can advance and move a non-welded portion of film within the welding head 4.

The apparatus 1 also comprises a power supplier connected to the welding head 4 and configured to provide electric power to the heater 5, optionally directly to the conductive strip 6, so as to enable the passage within the latter of an electric current flow. The control unit 50 is active on the power supplier and configured to command the latter and control the supply of electric power to the conductive strip 6. The control unit 50 is also configured to command the power supplier to carry out a heating cycle comprising the following steps:
- applying an electric voltage to the conductive strip 6 in order to generate a temperature increase of an exposed surface of the welding head 4 so as to bring it to a first temperature;
- controlling said electric voltage in order to maintain the exposed surface of the welding head 4 at the first temperature for a first discrete time interval;
- reducing or eliminating the voltage applied to the conductive strip 6 to reduce the temperature of the welding head 4 below said first temperature.

The first discrete time interval has a duration comprised between 0.2 and 5 seconds, in particular between 0.4 and 2 seconds. The heater 5 is maintained under voltage for a time period substantially equal to the first discrete time period.

The control unit 50 is configured for starting the above-described heating cycle at least during the second operative condition of the first and second tools 11, 12, i.e. when said tools are approached to each other and contact the film 2a. Due to the start of the heating cycle, the first and the second tool, in the second operative condition, heat-seal the film 2a. Indeed, the control unit 50 is configured to command the heating of the exposed surface of the welding head during the contact of the head with the film; the control unit is configured for canceling the voltage of the conductive strip when the first and second tools 11, 12 are spaced from each other and from the folded film.

Alternatively, the control unit can control the heating cycle such that the first and second tools 11, 12 contact the folded film in order to weld it during the step of reducing or eliminating the voltage applied to the conductive strip; in this case, the control unit 50 is configured to command the heating of the welding head (step of applying the electric voltage in order to bring the exposed surface of the welding head to the first temperature) during the first operative condition of the tools 11, 12, i.e. when the latter are separate from each other and separate from the film. The control unit 50 is configured for synchronizing the step of reducing or eliminating the voltage of the conductive strip with the second operative condition of the first and second tools 11, 12: the welding of the folded film occurs by means of the heat stored by the conductive strip and by the exposed surface during the first operative condition of the tools 11, 12.

As further variant, the control unit 50 can synchronize the second operative condition of said tools 11, 12 (tools in contact with the folded film) with at least one of the steps of the heating cycle. For example, it is possible to carry out a heating cycle in which the steps of control of the electric voltage and the step of reducing or eliminating the voltage are both defined during the second operative condition of the first and second tools 11, 12.

Following the welding of the continuous film 2a, the same defines a precursor body in a single piece comprising a plurality of containers 100, each of which defining a respective housing compartment 101. Exiting from the welding station 3, the containers 100 are crushed in order to define a sort of flat bag. The apparatus 1 comprises a preparation station 17 (FIGS. 2A, 2B) arranged downstream of the welding station 3 and configured for gripping and moving away the external film flaps 2a of the container so as to define, at the top of the container, an opening for the insertion of the products P.

Downstream of the preparation station 17, according to the advancement path of the film 2a, the apparatus 1 comprises a positioning station 16 for positioning products P configured for placing at least one product in the housing compartment 101 of at least one container 100. The preparation station 17 allows widening the opening of each container 100 so as to facilitate the positioning of the products within the housing compartment 101.

The apparatus 1 can comprise a closure station 18 for the containers 100 arranged downstream of the positioning station 16; the closure station is configured for hermetically sealing the container. In fact, the container entering into the closure station 18 is heat-sealed and then sealed at the bottom portion 2b and on the side of the top portion 2c: the welding station essentially executes "U" welding on the film to delimit said container. The closure station 18 executes a further welding at the end portion of the film 2a opposite the bottom portion folded so as to hermetically close the housing compartment containing the product P. The closure station 18 can comprise:
- a device for inserting at least one cap at the open top of the container,
- a welder configured for sealing, optionally welding, opposite flaps of the top of the container together with the cap.

As described above, the folded film 2a is unwound from the reel in continuous form. The apparatus 1 comprises a cutting station 15 configured to cut the continuous film to define a plurality of discrete containers 100. FIG. 2A illustrates a first configuration of the apparatus in which the cutting station 15 is spaced and arranged downstream of the welding station 3 with respect to the advancement path A of the film 2a. In FIG. 2A, the cutting station has been schematized in interposition between the positioning station 16 and the closure station 18. It is possible to provide for a cutting station 15 arranged downstream of the closure station 18 or in interposition between the preparation station 17 and the positioning station 16. For the present embodiment variants (cutting station separated from the welding station 3), it is possible to use the driving group 19 placed downstream of the welding station 3 and in particular interposed between the welding station 3 and the cutting station 15; the film 2a is in continuous form exiting from the welding station 3 and can be pulled/stretched from a position downstream of the latter.

FIG. 2B illustrates a second configuration of the apparatus 1 in which the cutting station 15 is part of the welding station 3 and is configured for executing the cutting of the continuous film 2a welded in proximity to the welding head 4; in this second configuration between the cutting station 15 and the welding station 3 there are no stations, for example, for processing the film or for filling the container 100. For the latter described variant, a driving group 19 can be employed that is arranged upstream of the welding station and in particular interposed between the welding station 3 and the supply station 2: the group 19 drives the film from the supply station 2 and pushes/guides it into the welding station 3. For such variant a gripping member will still be provided, e.g. one or more movable grippers, configured for gripping on the film before cutting and picking up the separate containers (single packs or bags) from the welding station after the cutting in order to bring them to the following stations. The control unit 50 is also active commanding the cutting station 15, the positioning station 16, the preparation station 17 and the closure station 18; the control unit is configured for:
- commanding the cutting of the film 2a to the cutting station 15 during the film stop step 2a, optionally during the heating cycle of the welding head 4,
- commanding the positioning of at least one product in the housing compartment of a container to the positioning station during the film stop step 2a, optionally during the heating cycle of the welding head 4,
- commanding the preparation station 17 to open the container during the film stop step 2a, optionally during the heating cycle of the welding head 4,
- commanding the closure station 18 to seal the container during the film stop step 2a, optionally during the heating cycle of the welding head 4.

The control unit 50, during the film stop step 2a, is configured for synchronizing the welding of the film executed by the welding station 3 with the command of the following stations: cutting station 15, positioning station 16, preparation station 17, closure station 18.

Method

Also forming the object of the present invention is a method of making containers 100 of the type using an apparatus 1 in accordance with any one of the enclosed claims and/or in accordance with the detailed description reported hereinbelow.

The method described hereinbelow, preferably using the apparatus 1 comprises various method steps which will be described hereinbelow in detail and which can be carried out by a control unit 50 which acts on suitable actuators and/or motors and/or pumps and/or valves so as to attain the various described steps and in particular determine the movements of movable parts; the control unit 50 can also be employed for controlling the insertion of one or more products within the containers made by the same apparatus.

The method comprises a step of arranging a continuous film 2a having at least one folded portion 2b comprising a number of superimposed flaps equal to or greater than 3. Such step of arranging the film 2a comprises an unwinding of the film 2a from a reel according to a flat configuration. The flat continuous film 2a is moved within a folding station 14 set for defining the folded portion 2a. In detail, following the folding step the folded portion 2b has a substantially "W" shape and is composed of four superimposed film flaps (FIG. 3), and specifically it is constituted by two external film flaps and two internal film flaps; from the external flaps of the folded portion 2b, respective flaps defining a top portion 2c of the film 2a emerge as an extension.

The folded film 2a is moved, with advancing pitches in a non-continuous manner, at the welding station 3 where the head 4 executes the welding of the film 2a. By movement with advancing pitches of the film it is intended an alternating movement of advancing steps of the film for a predetermined advancement pitch with stop pitches in which the film 2a is maintained, for a predetermined time interval, fixed with respect to the frame 1a of the apparatus 1. In detail, the welding step comprises a step of placing in contact the welding head 4 with the film 2a in interposition between the first and second tools 11, 12. In detail, the welding step comprises at least the following sub-steps:

placing the first and the second tool 11, 12 of the welding head in the first operative condition in which the tools are spaced from each other;

arranging the film between said first and second tools arranged in the first operative condition. The step of arranging the film comprises the step of moving the film for at least one advancing pitch;

placing the first and second tools 11, 12 of the welding head 4 in the second operative condition in a manner such that said tools can act by pressing on the film 2a arranged interposed between the latter. During such step, the film is in the stop step and hence fixed with respect to the frame 1a. In this manner, the tools can correctly compress the film for a predetermined time interval adapted to ensure the welding of the film, in particular of the folded portion 2b;

at least during the step in which said first and second tools are in the second operative condition, applying a controlled electric voltage (or current) to the conductive strip 6 of the at least one heater 5 of at least one from between the first and second tools 11, 12 in order to generate a temperature increase of an exposed surface of the welding head 4 so to bring it to the first temperature so as to enable the welding of the film and the obtainment of said container;

following the welding of the film, arranging the first and the second tool 11, 12 in the first operative condition;

moving said container together with the continuous film along the advancement path exiting from the welding head. The film 2a is moved for at least one further advancing pitch such that the welded film portion can exit from the welding station and enable the insertion of a film portion still to be welded.

During the welding step, at least during the sub-step in which said first and second tools 11, 12 are in the second operative condition, the method provides for maintaining the electric voltage to the conductive strip 6 in order to maintain the exposed surface of the welding head 4 at the first temperature for a first discrete time interval. The first discrete time interval has a duration comprised between 0.2 and 5 seconds, in particular between 0.4 and 2 seconds; the heater 5 is maintained under voltage for a time period substantially equal to the first discrete time period.

As described above for the apparatus 1, the welding step (contact of the tools 11, 12 with the folded film) can occur during at least one of the steps of the heating cycle. Following the step of welding the film 2a during which there is the formation of at least one container on the film 2a, the method comprises a step of reducing or eliminating the voltage applied to the conductive strip 6 in order to reduce the temperature of the welding head 4 below said first temperature; such voltage reduction or elimination step is executed:

when said first and second tools are in the second operative condition; or when said first and second tools are being moved from the second to the first operative condition; or when said first and second tools are in the first operative condition.

Indeed, during the method of making the containers 100, the voltage is provided to the conductive strip 6 in a non-continuous manner only for predetermined time intervals such to reduce the energy consumption and prevent undesired overheating of the welding head.

Due to the properties of the heater 5, the method is capable of executing the welding of the film 2a to obtain said container by means of a single step of contact of the welding head 4 with the film 2a. The welding step forms at least one container 100 comprising:

a bottom portion defined by the folded portion 2b of the film;

a top portion 2c integrally joined with the bottom portion and emerging from the latter. The top portion defining an opening delimited by a free edge configured for enabling the insertion of at least one product in the container.

The welding on the bottom portion and on the top portion has a substantially "I" or "U" or "⌊ ⌋" shape.

Within the containers open at the top that are exiting from the welding station, one or more products P are inserted. The filled container is then hermetically sealed in a closure station.

The method also comprises a step of cutting the continuous film 2b exiting from the welding station 3 so as to define discrete containers 100. The cutting step can be executed, by means of a cutting station 15:

on a film portion 2a at the welding station (i.e. on empty containers immediately exiting from the station 3), or on a film portion defined by containers 100 filled with at least one product P.

Advantages of the Finding

The present invention involves considerable advantages. The use of a heater 5 which, at least in a predetermined temperature range, having an electrical resistivity which decreases upon the increase of the temperature, as mentioned above allows a welding head capable of providing more heat to the zones of the film which more greatly require it: the heater 5 is capable of self-regulation as a function of the material (film) to be welded and providing more heat to the zones with great energy absorption. Due to the specific structure of the heater 5, the welding station 3 is capable of correctly sealing the film 2a by means of only one welding step, i.e. a single contact of the welding head 4 with the film 2a: the apparatus 1 by means of one single welding head 4 is capable of ensuring a correct welding of the film 2*a* without the same welding having to be considered to be "redone" in other steps.

Such aspect of the heater is particularly advantageous for obtaining packs made of plastic film, particularly deformable and extensible if subjected to heat. The presence of only one welding station reduces such deformations to the minimum, thus allowing avoiding the use of complex film adjustment systems for the correct advancement thereof. It can be perceived that the presence of a multiplicity of welding stations, as provided for in the state of the art, introduces various points where the film sustains considerable deformations that must be compensated for by means of complex film adjustment systems of the film in a manner such that the same can reach the stations of the apparatus in the correct position.

As mentioned above, the structure of the heater 5, object of the present invention, renders the welding head 4 highly flexible in the use thereof: the same heater 5, due to the capacity of self-regulation of the heat, can be employed for the welding of different types of film 2*a*, also with different shapes and thicknesses. The user therefore does not have to substitute the welding head 4 in the case of a film change (material change) with consequent advantage in terms of productivity.

It is also indicated that the possibility to execute the welding of the film in a single step allows arranging the cutting station of the film adjacent or even inside the single welding station (see FIG. 2B) in a manner such to be able to execute the cutting of the film with extreme precision; indeed, the film at the single welding station results little or not at all deformed, a condition which allows executing an extremely precise cutting of the extended film without having to execute complex position adjustment thereof.

The invention claimed is:

1. An apparatus for making containers made of sheet material, said apparatus comprising:
   a supply station configured to supply a film, the film having at least one folded portion having three or more film flaps folded and superimposed with respect to each other,
   a welding station configured to receive the film from the supply station, wherein the welding station comprises at least one welding head configured to contact the film and weld at least the folded portion of said film to form a container having a housing compartment, wherein the welding head comprises at least one heater made of electrically conductive material having an electrical resistivity which, at least in a predetermined temperature range, decreases upon the increase of temperature of the electrically conductive material; and
   at least one power supplier connected to the welding head and configured to provide electric power to the heater so as to enable the passage of an electric current flow within the heater, the apparatus further comprises a control unit active on the power supplier and configured to command the power supplier and control the supply of electric power to the heater, said control unit being further configured to command to the power supplier a heating cycle comprising:
      applying an electric voltage to the conductive strip of the heater to generate a temperature increase of an exposed surface of the welding head so to take it to a first temperature;
      controlling said electric voltage to maintain the exposed surface of the welding head at the first temperature for a first discrete time interval; and
      reducing or eliminating the voltage applied to the conductive strip of the heater to reduce the temperature of the welding head below said first temperature.

2. The apparatus of claim 1, wherein the welding head is movable between:
   a rest position where it is spaced from the film, and
   a welding position wherein the welding head contacts the film;
   wherein the control unit is configured to control the welding head so that, during each heating cycle, said head maintains the welding position at least during said first discrete time interval.

3. The apparatus of claim 1, wherein the control unit is active in command on the supply station and the welding station, said control unit being configured to command to the supply station an advancement cycle comprising:
   moving the film along the advancement path for a predetermined time interval;
   stopping the film for a respective predetermined time interval;
   wherein the control unit is configured to interval movement steps with stop steps so as to generate a discontinuous advancement of the film,
   said control unit being configured to command to the welding station the welding of the film during the film stop step,
   wherein the control unit is configured to command the first and the second operative condition of the first and second tools of the welding head, the control unit being configured to:
      synchronize the first operative condition of the first and second tools with the moving the film,
      synchronize the second operative condition of the first and second tools with the stopping the film.

4. A method, comprising:
   using the apparatus of claim 1 to make folded film containers.

5. A method of making containers using the apparatus of claim 1, said method comprising:
   arranging a continuous film having at least one folded portion comprising a number of superimposed flaps equal to or greater than three,
   positioning the continuous film at the welding head of the welding station,
   welding the continuous film by the welding head in order to define at least one container.

6. The method of claim 5, wherein the arranging of the film comprises:
   unwinding a continuous film from a reel according to a flat configuration,
   folding said flat film to define the folded portion having a number of superimposed film flaps equal to or greater than three,
   wherein, following the folding step, the folded portion is substantially W-shaped,
   wherein the welding step comprises at least one step of placing the welding head in contact with the film, optionally at least with the folded portion of the film,
   wherein the welding comprises at least:
      placing the first and the second tool of the welding head in the first operative condition in which the tools are spaced from each other,
      arranging the film between said first and second tools placed in the first operative condition, placing the first and second tools of the welding head in the second operative condition so that said tools can act by pressing on the film arranged interposed between the tools, at least during the step in which said first and second tools are in the second operative condition, applying an electric voltage to the conductive strip of the at least one heater of at least one among the first and second tools in order to generate a temperature increase of an exposed surface of the welding head so to take it to a first temperature such to enable the welding of the film and make said container, following the welding of the film, placing the first and the second tool in the first operative condition, moving said container together with the continuous film along the advancement path exiting from the welding head.

7. The method of claim 5, wherein the welding of the film to make said container occurs in a single step of contact of the welding head with the film.

8. The method of claim 5, further comprising at least cutting the continuous film exiting from the welding station so as to define discrete containers.

\* \* \* \* \*